(12) United States Patent
Kim et al.

(10) Patent No.: US 11,896,162 B2
(45) Date of Patent: Feb. 13, 2024

(54) BLENDER

(71) Applicant: LG ELECTRONICS INC., Seoul (KR)

(72) Inventors: Namhun Kim, Seoul (KR); Kyungsoo Hwangbo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 177 days.

(21) Appl. No.: 17/504,038

(22) Filed: Oct. 18, 2021

(65) Prior Publication Data

US 2022/0125246 A1    Apr. 28, 2022

(30) Foreign Application Priority Data

Oct. 26, 2020 (KR) .......................... 10-2020-0139133

(51) Int. Cl.
*A47J 43/07* (2006.01)
*A47J 43/046* (2006.01)
*G06F 3/041* (2006.01)

(52) U.S. Cl.
CPC ......... *A47J 43/0722* (2013.01); *A47J 43/046* (2013.01); *G06F 3/0414* (2013.01); *G06F 2203/04104* (2013.01)

(58) Field of Classification Search
CPC .. A47J 43/04; A47J 43/07; A47J 43/08; A47J 43/085; A47J 43/087; B01F 35/2206; B01F 35/2209; G05B 2219/13001
See application file for complete search history.

(56) References Cited

U.S. PATENT DOCUMENTS

| | | | |
|---|---|---|---|
| 4,857,887 A * | 8/1989 | Iten | H03K 17/9643 200/512 |
| 5,347,205 A | 9/1994 | Piland | |
| 6,397,735 B1 | 6/2002 | Wong | |
| 10,327,594 B2 | 6/2019 | Ivarsson et al. | |
| 2002/0141286 A1 | 10/2002 | Wulf et al. | |

(Continued)

FOREIGN PATENT DOCUMENTS

EP    2556778 A1 *  2/2013  ............ A47J 27/004
JP    2017100224 A    6/2017

(Continued)

OTHER PUBLICATIONS

HR2097/00: Philips Blender Avance Collection: Issue date Mar. 15, 2019; (3 Pages).

*Primary Examiner* — Katrina M Stransky
*Assistant Examiner* — P Derek Pressley
(74) *Attorney, Agent, or Firm* — Bryan Cave Leighton Paisner LLP

(57) ABSTRACT

A blender includes a jar including a blade module to cut an object, a main body to receive the jar and including a motor to rotate the blade module, and a controller disposed inside the main body and configured to operate the motor. The main body further includes an outer case and forming an outer structure of the main body. The outer case includes a touch input portion on an outer surface of the outer case. A touch sensor is disposed on an inner surface of the outer case at a position corresponding to the touch input portion to detect a touch input on the touch input portion. The controller is configured to determine an operation time period of the motor based on the touch input detected by the touch sensor.

18 Claims, 23 Drawing Sheets

(56) References Cited

U.S. PATENT DOCUMENTS

| | | | |
|---|---|---|---|
| 2005/0152215 A1 | 7/2005 | Stuart et al. | |
| 2013/0334349 A1* | 12/2013 | Carden | A47J 43/0716 |
| | | | 241/101.2 |
| 2016/0296899 A1* | 10/2016 | Hoare | A47J 43/046 |
| 2018/0206677 A1* | 7/2018 | Ivarsson | A47J 36/24 |
| 2018/0353013 A1* | 12/2018 | Golino | A47J 43/046 |

FOREIGN PATENT DOCUMENTS

| | | |
|---|---|---|
| JP | 2018134259 A | 8/2018 |
| KR | 10-1998-0047123 A | 9/1998 |
| KR | 1020200040045 A | 4/2020 |

* cited by examiner

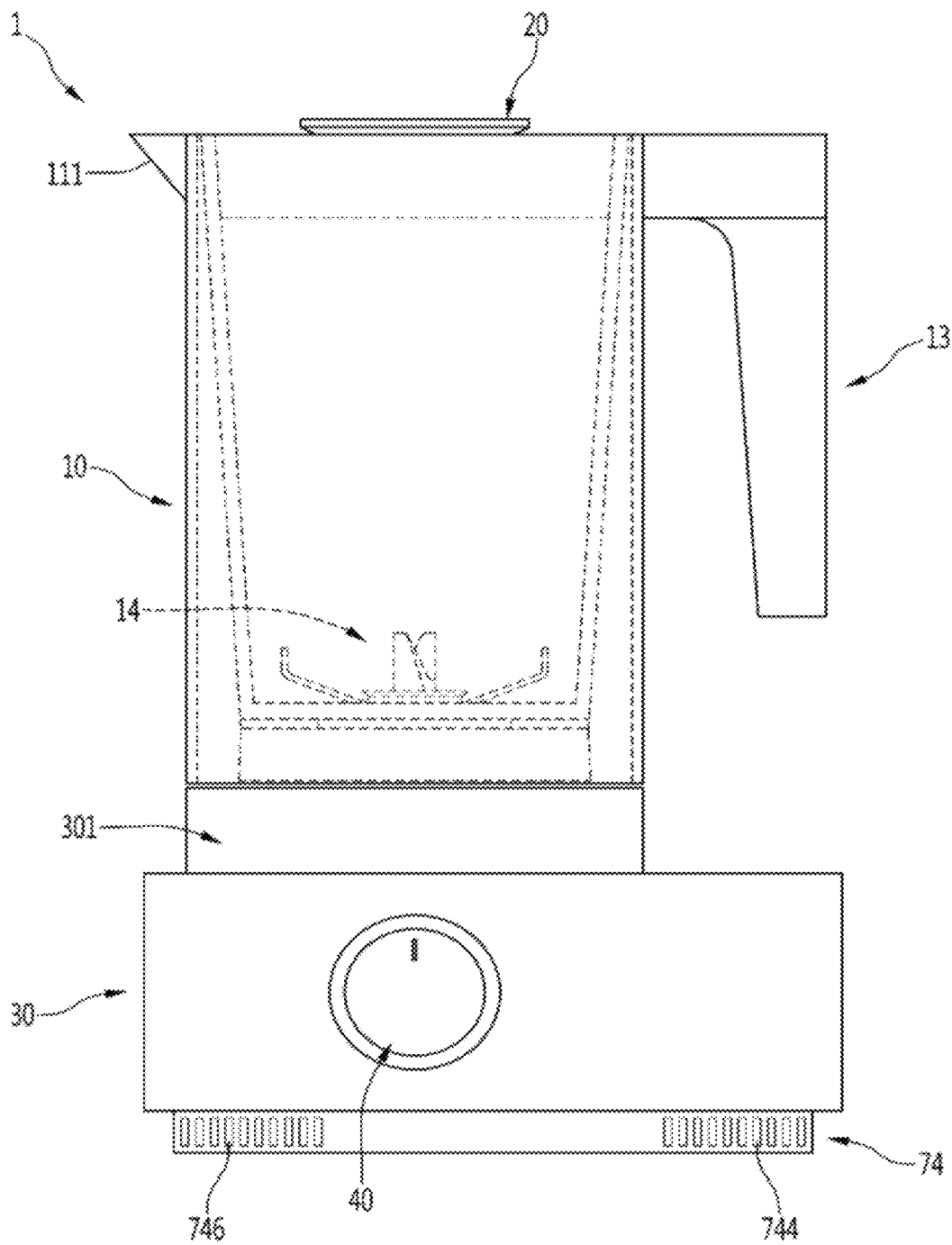
[FIG. 1]

[FIG. 2]
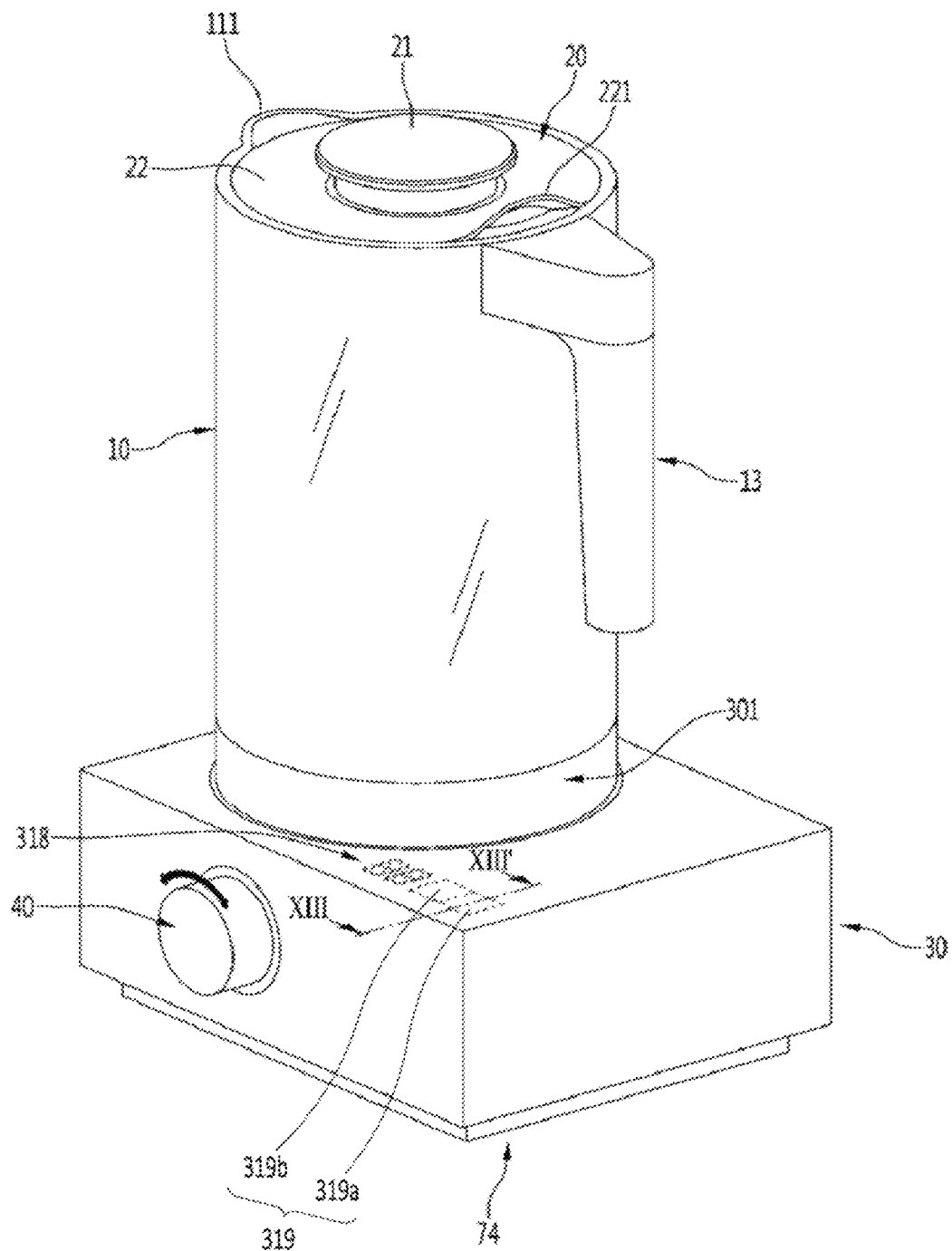

[FIG. 3]
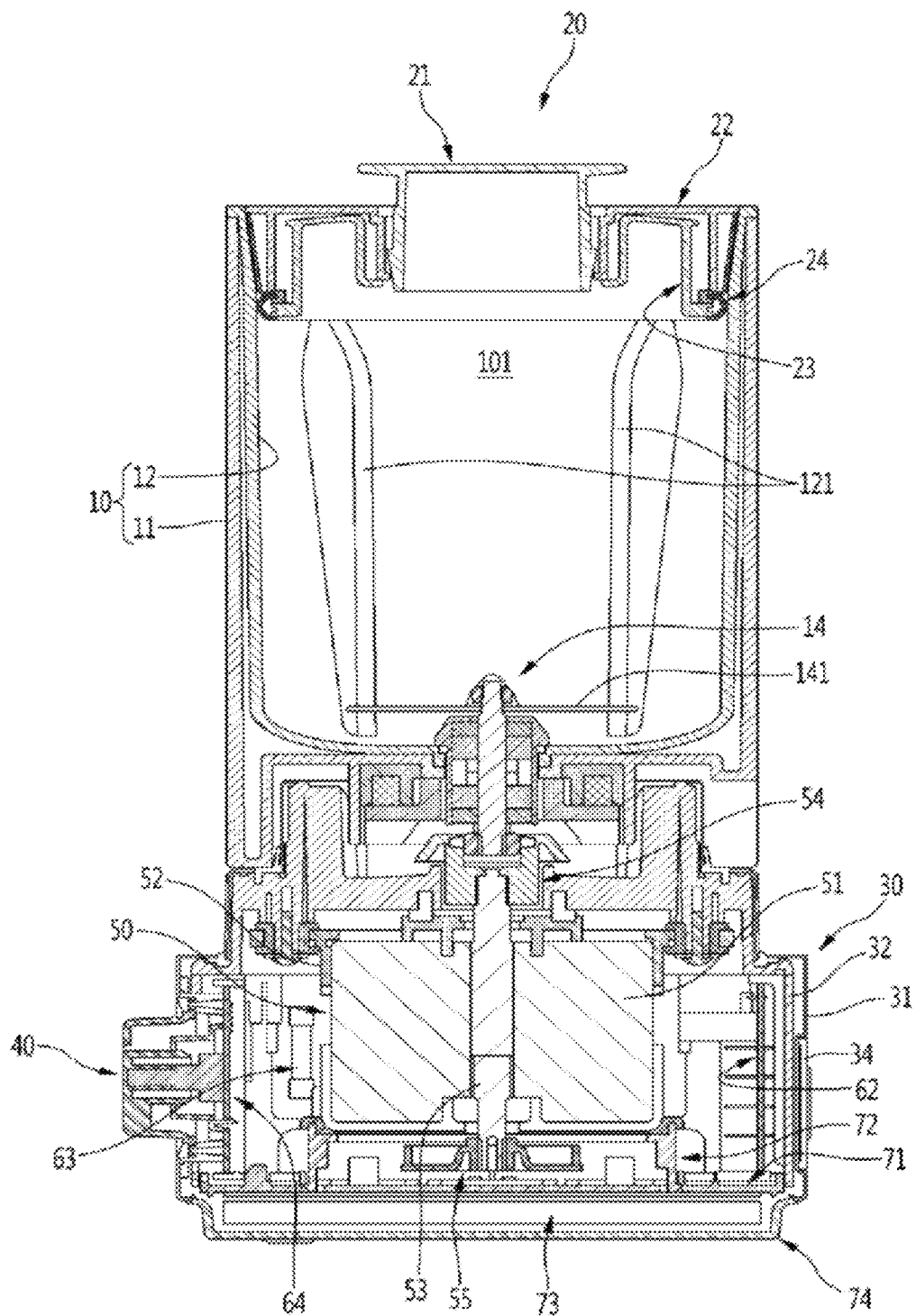

[FIG. 4]
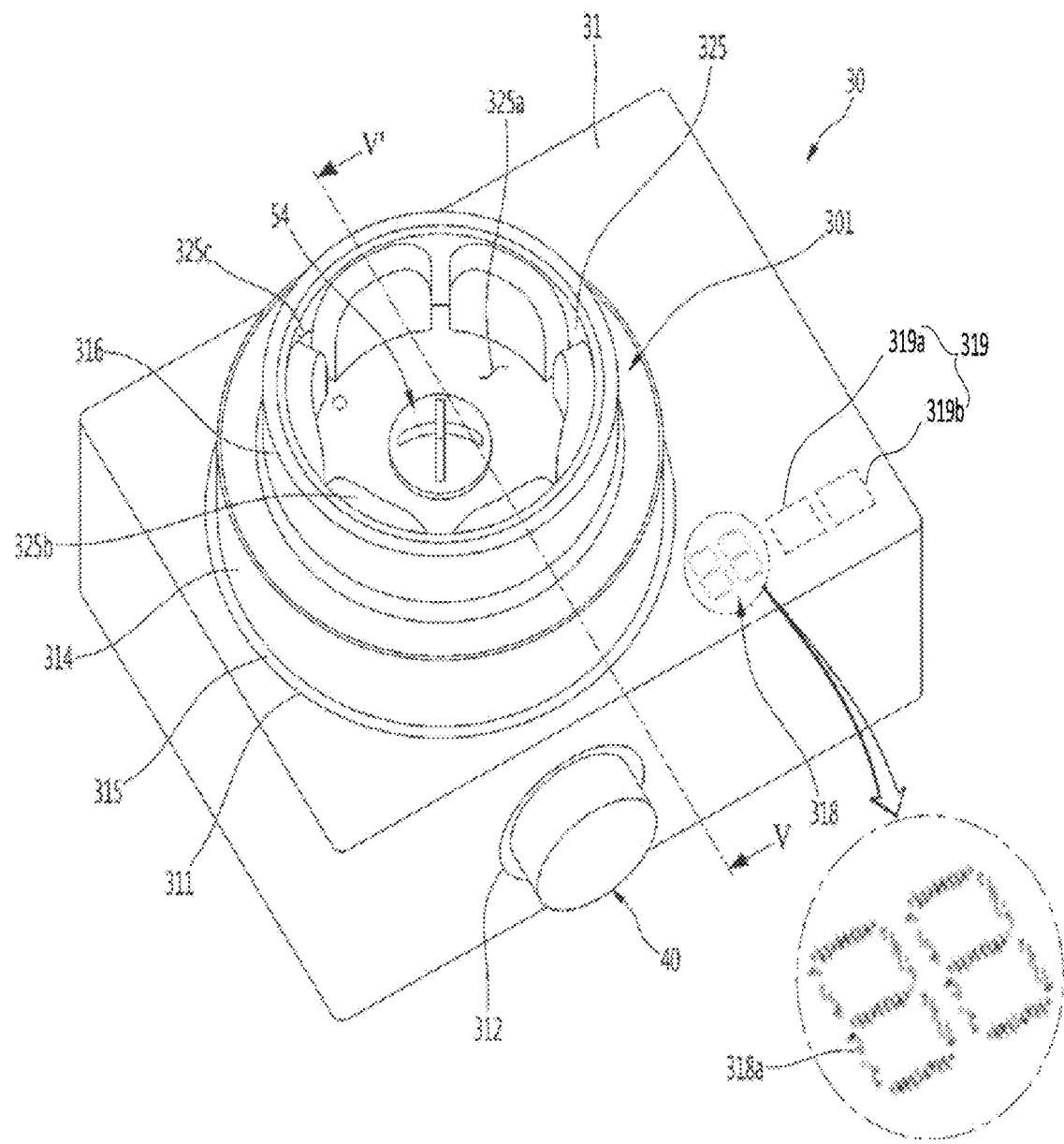

[FIG. 5]
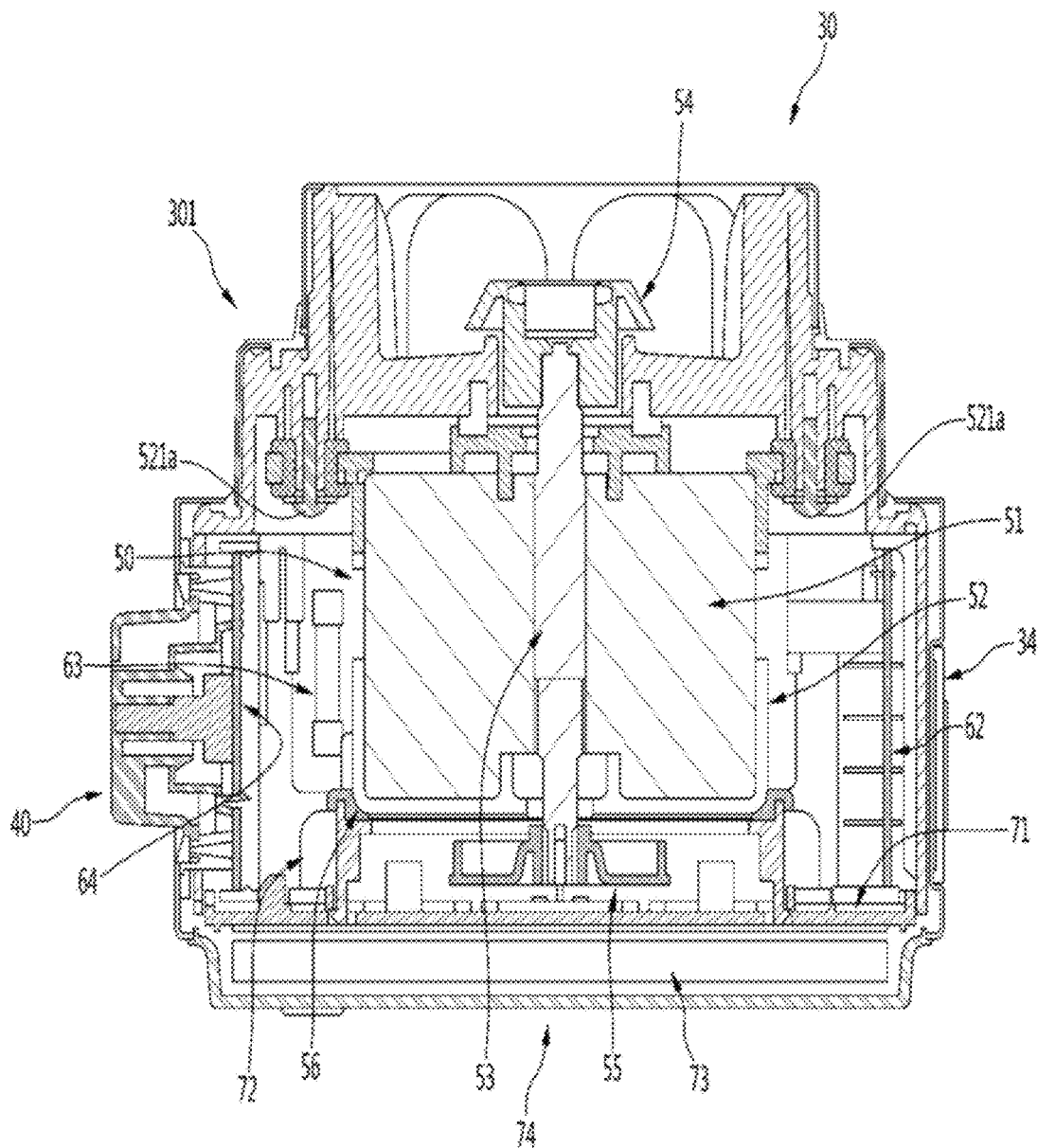

[FIG. 6]
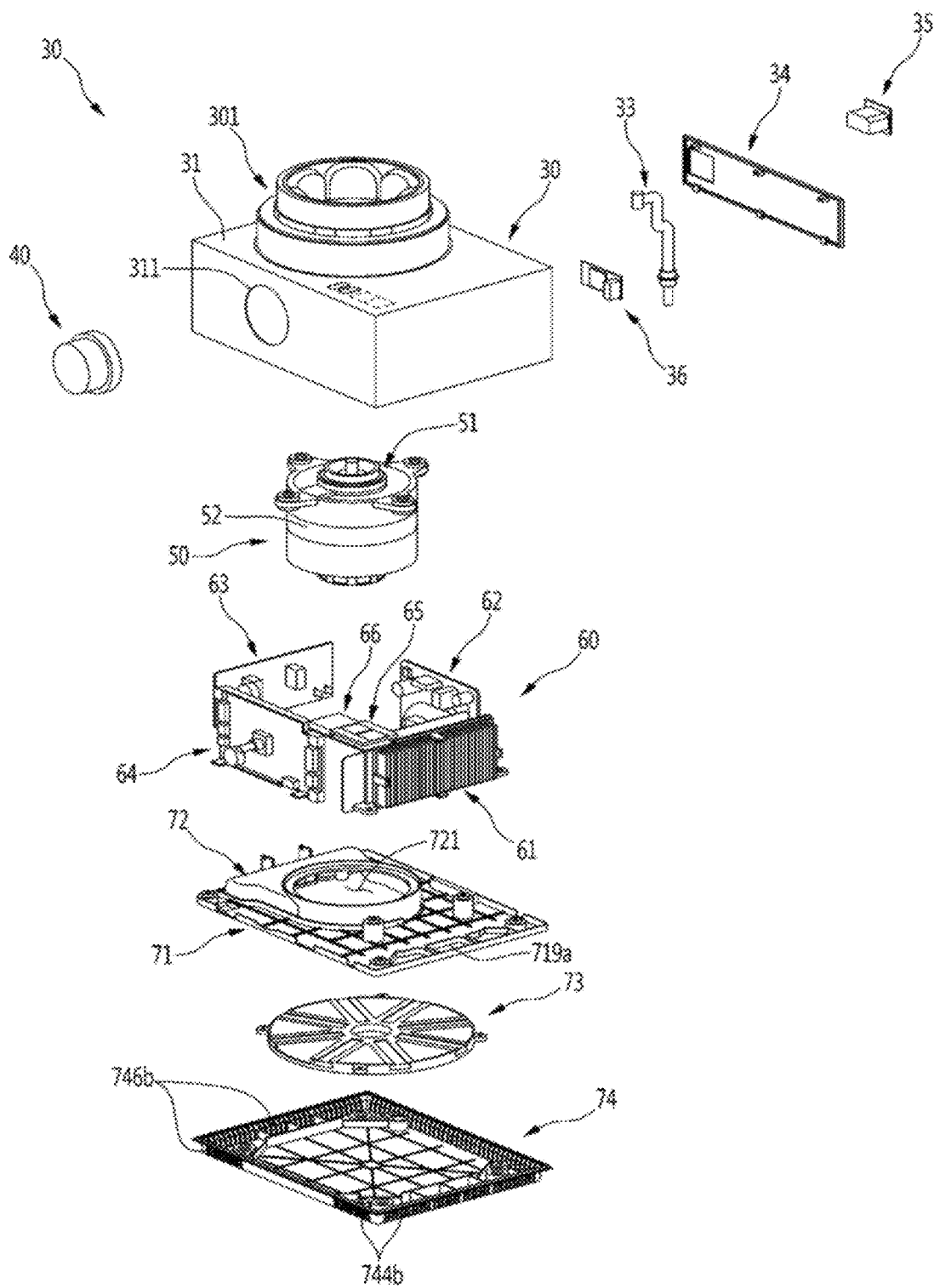

[FIG. 7]
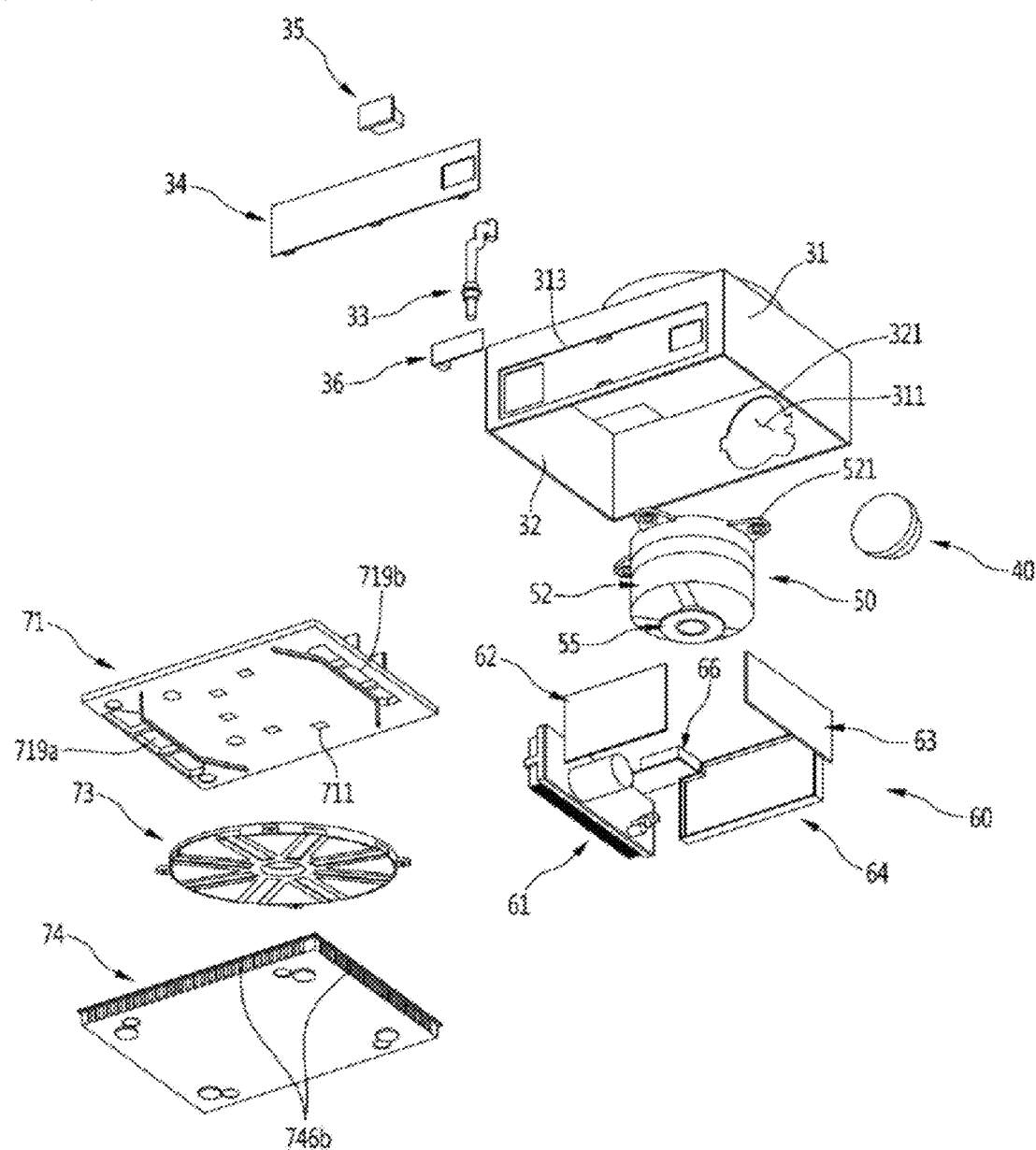

[FIG. 8]
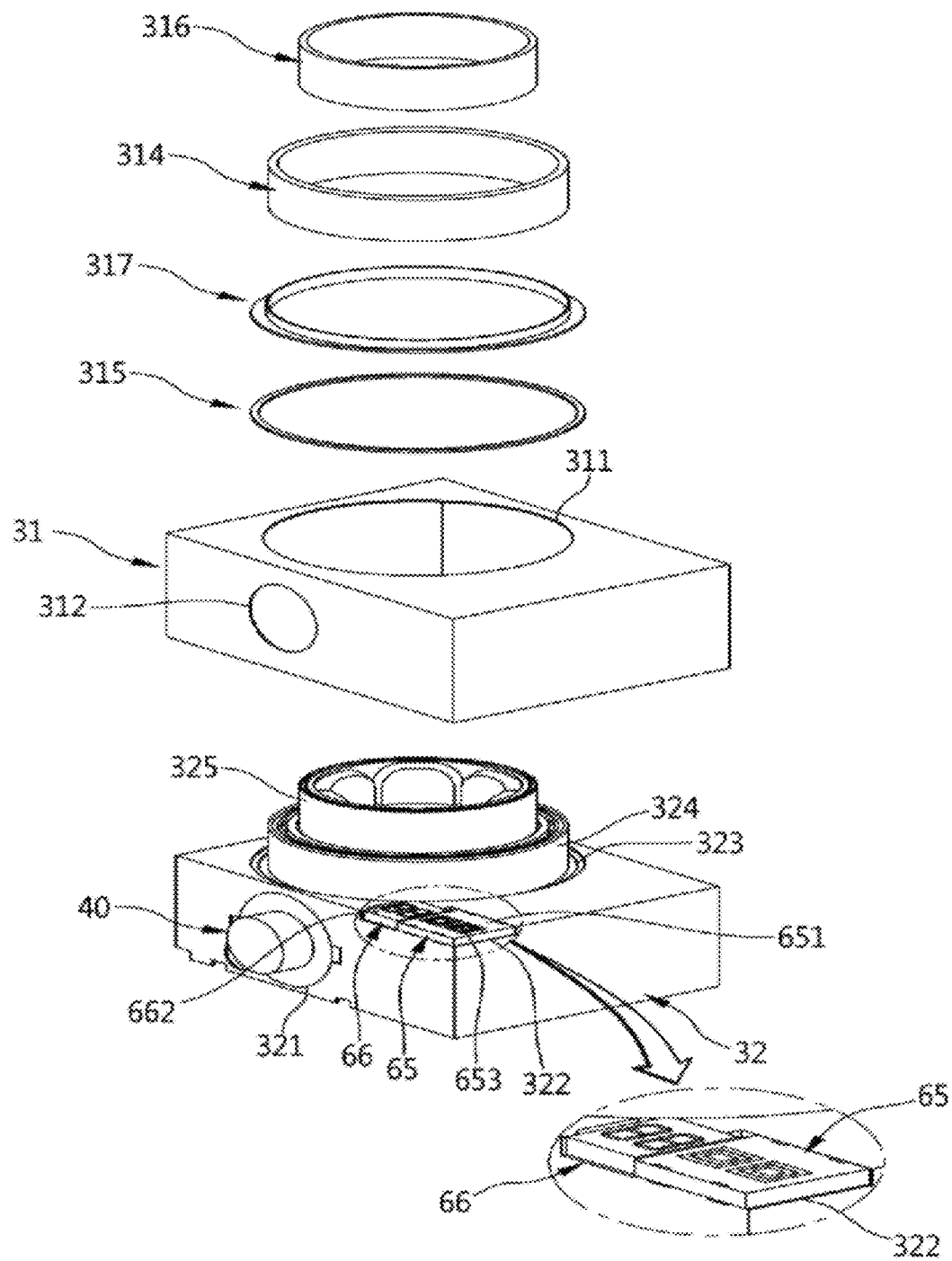

[FIG. 9]
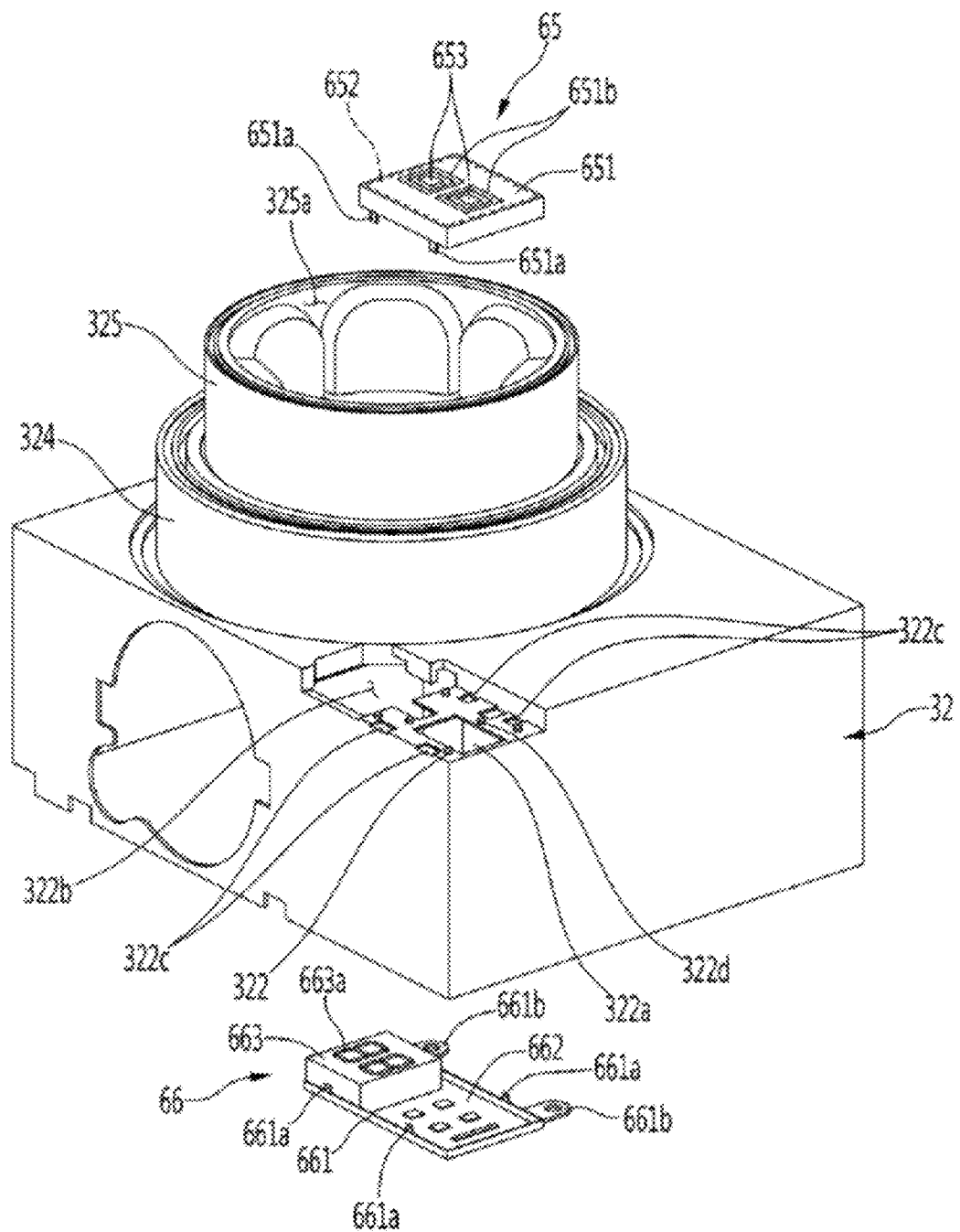

[FIG. 10]
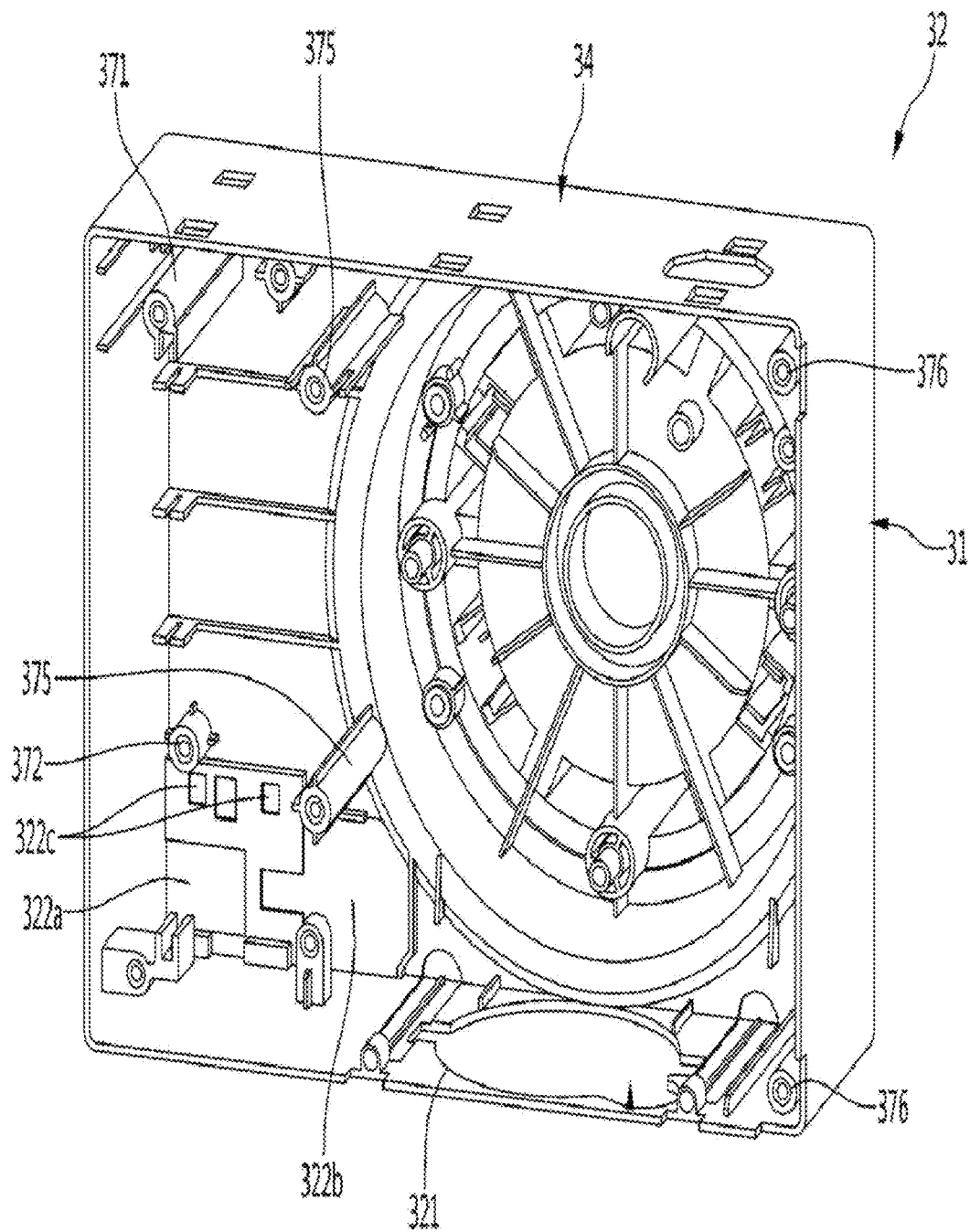

[FIG. 11]
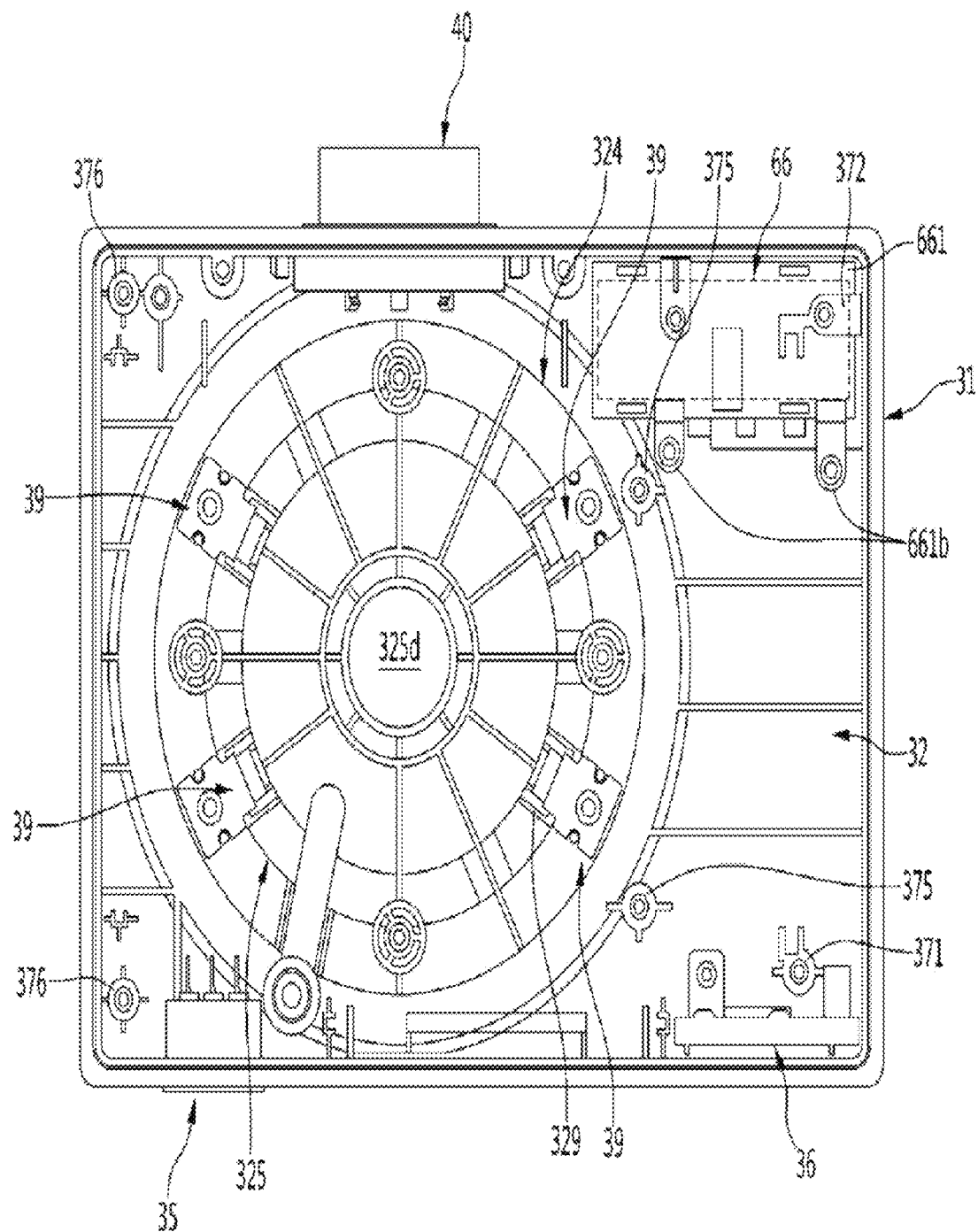

[FIG. 12]
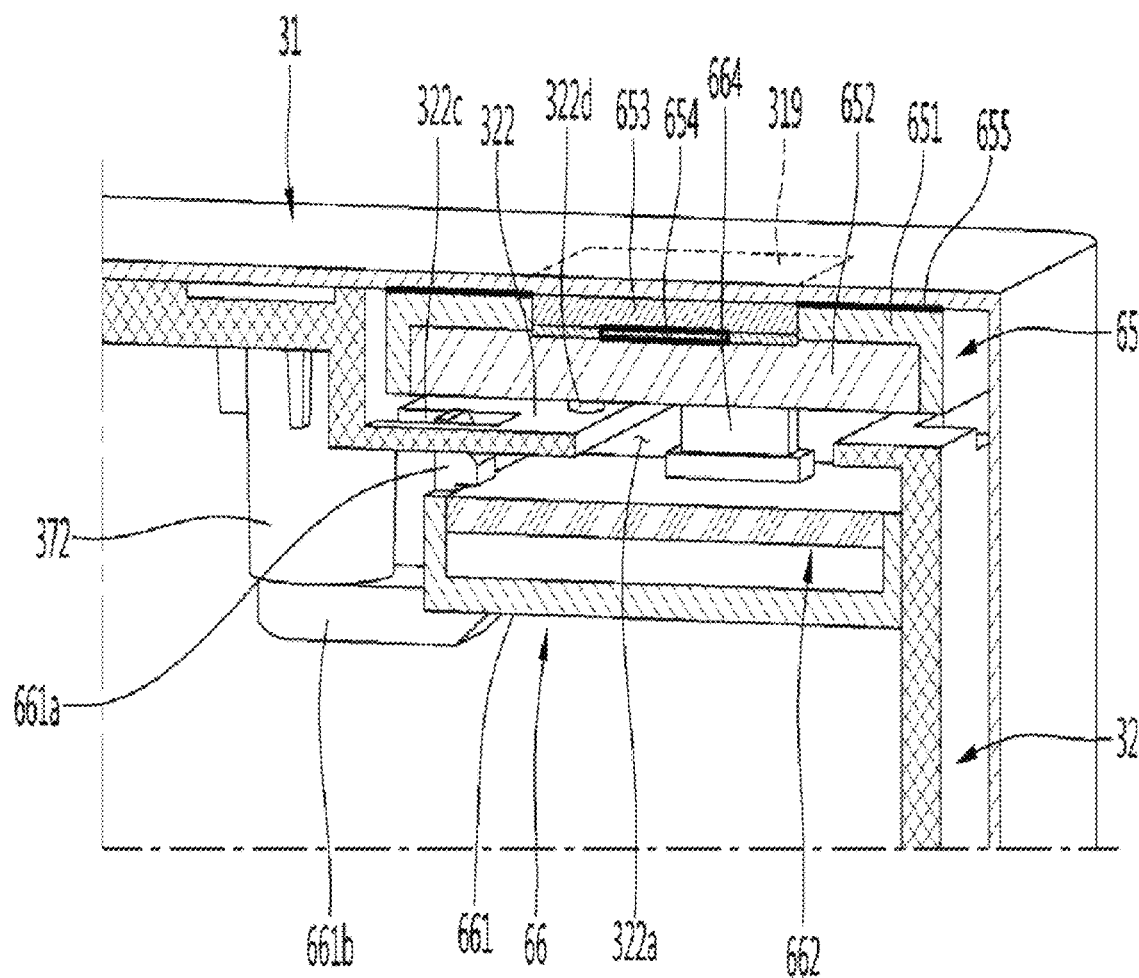

[FIG. 13]
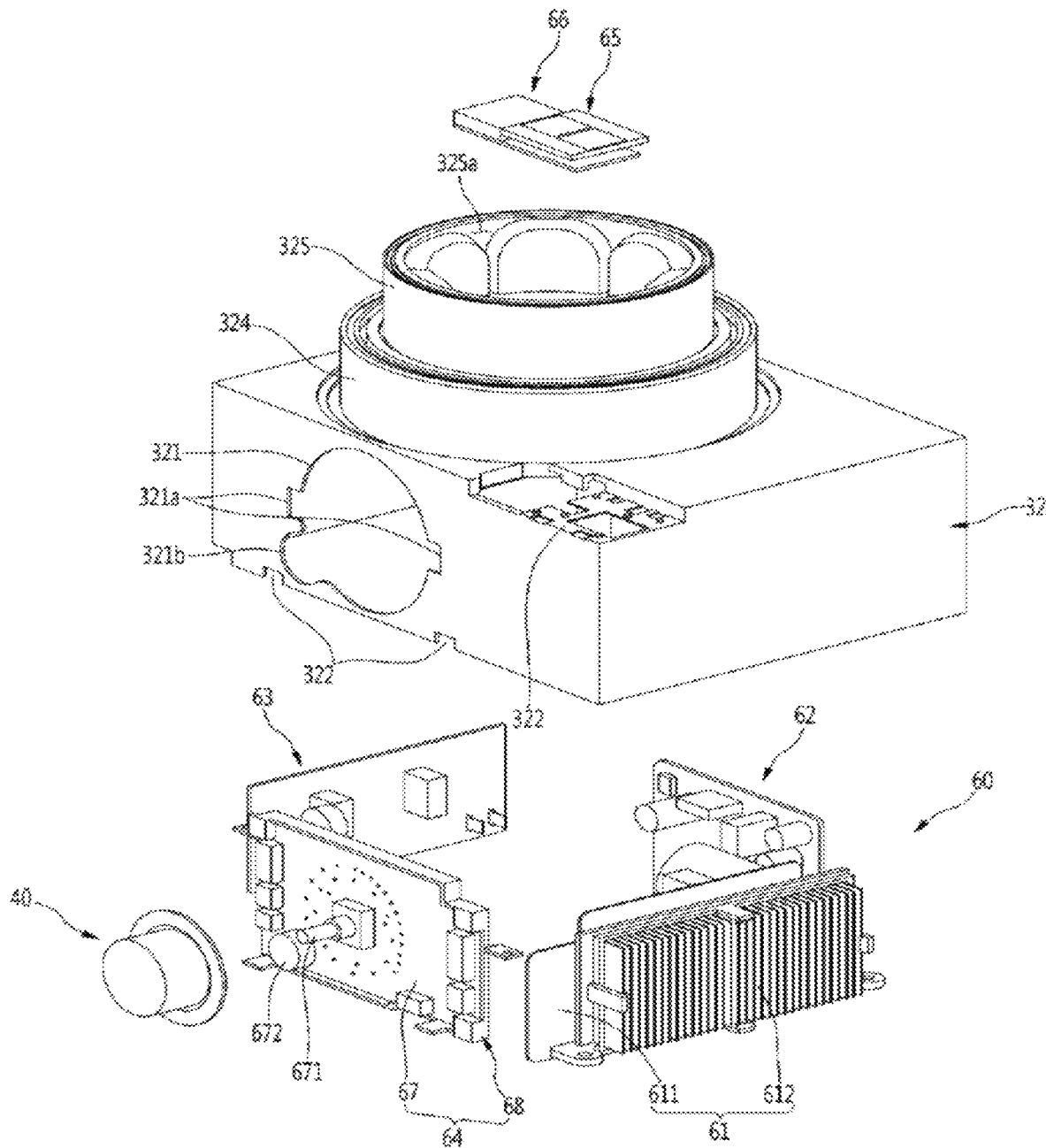

[FIG. 14]
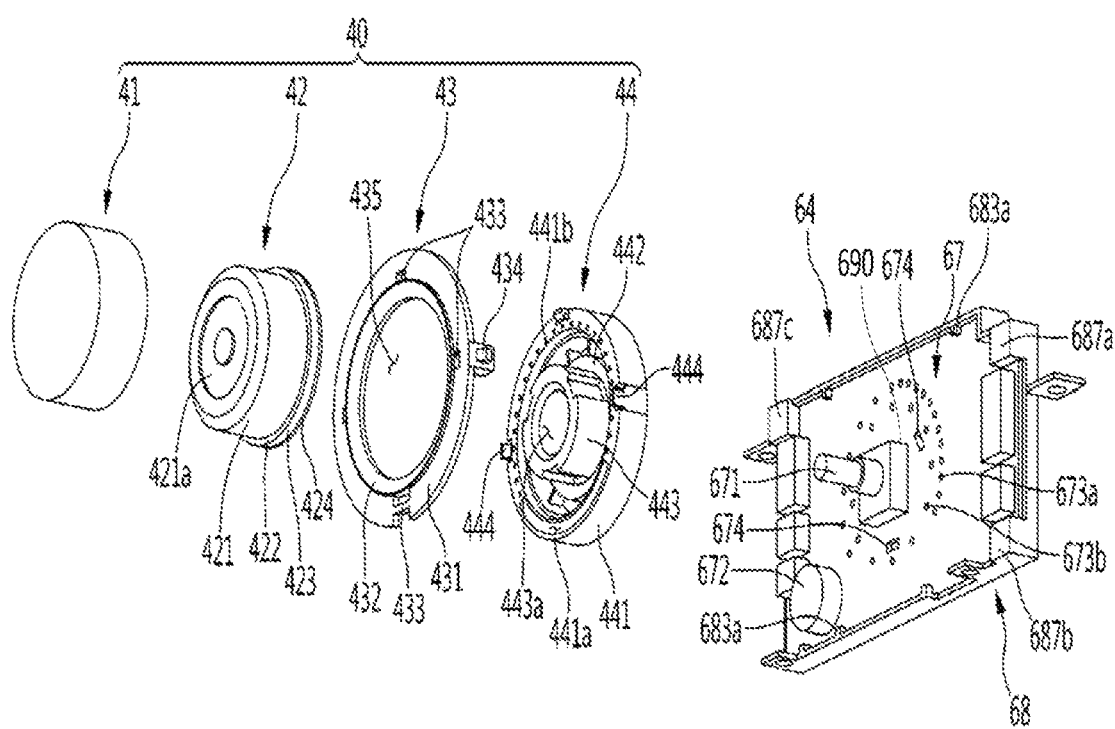

[FIG. 15]
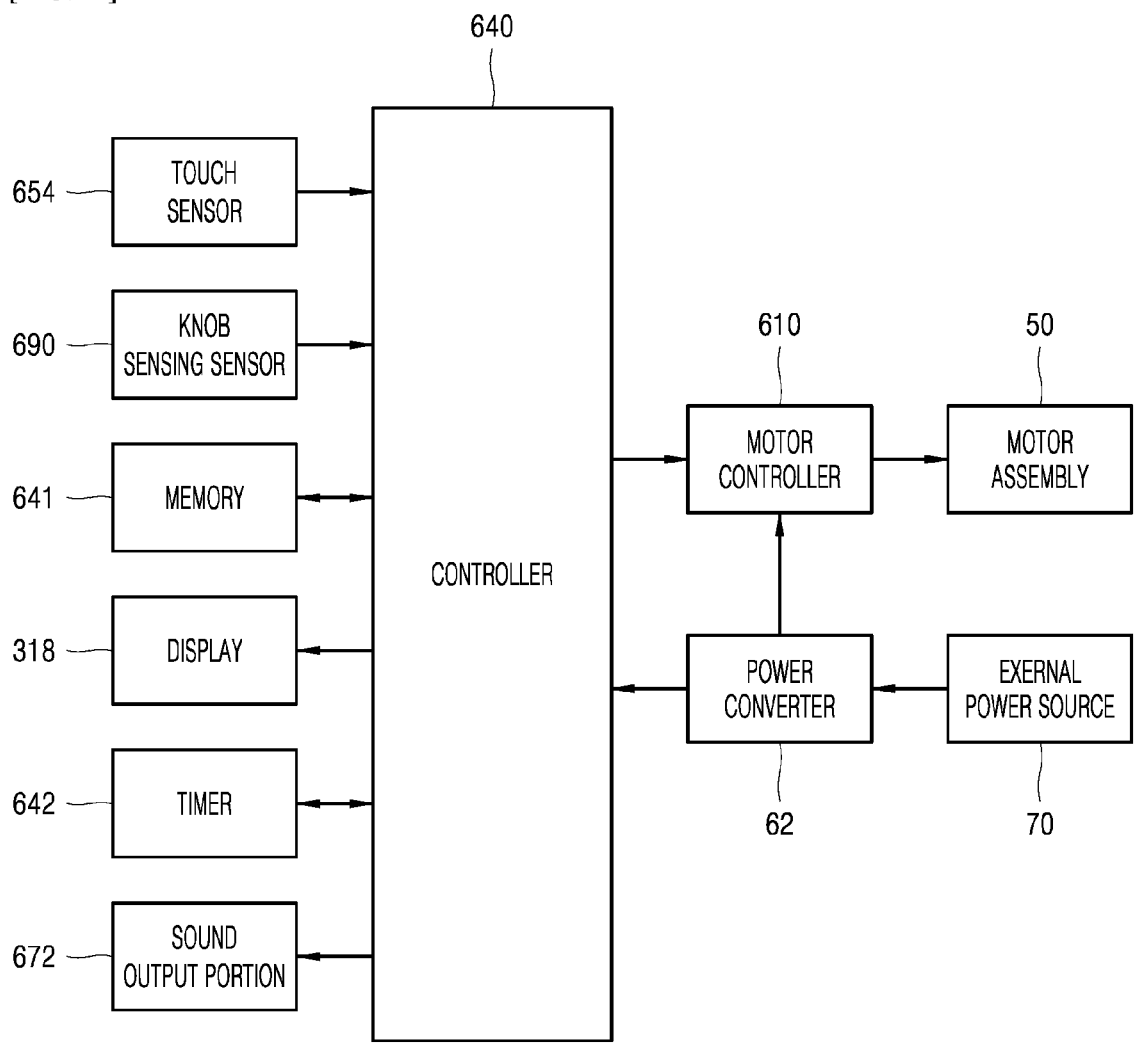

[FIG. 16]
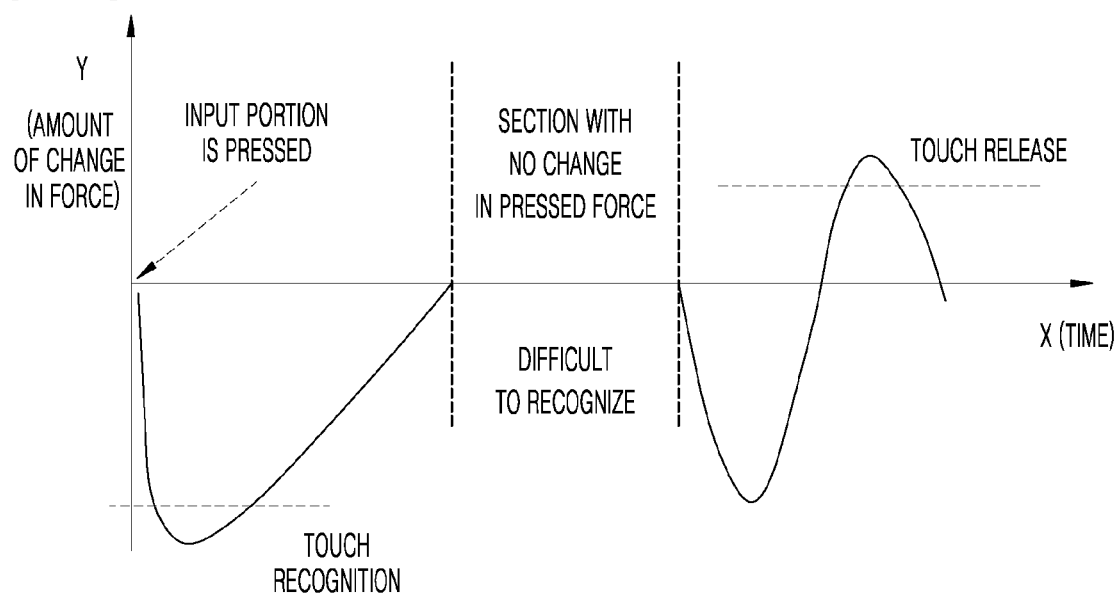

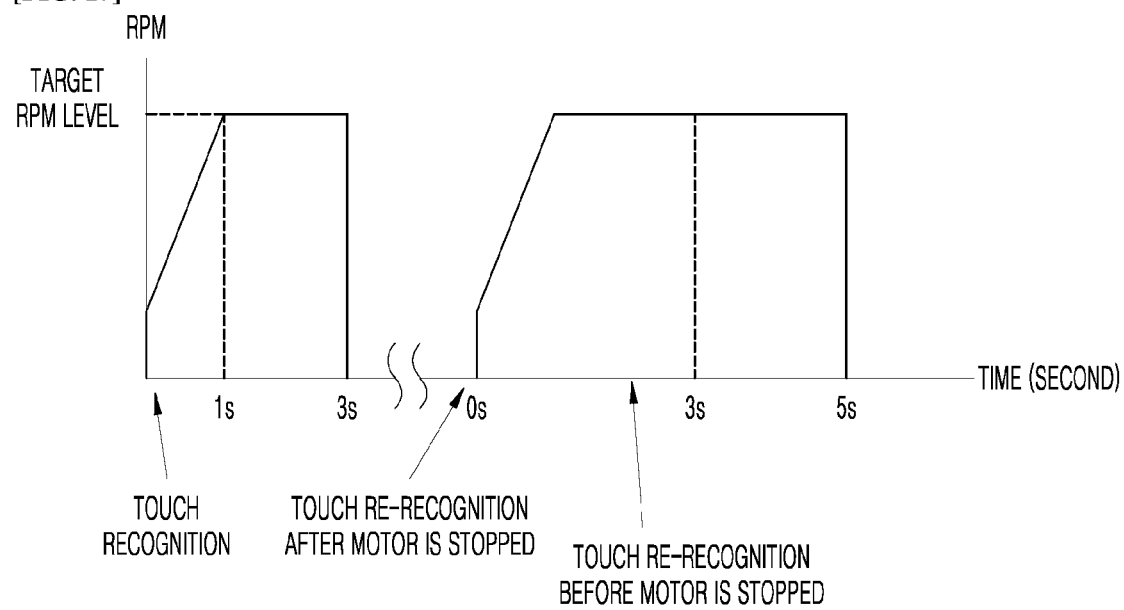

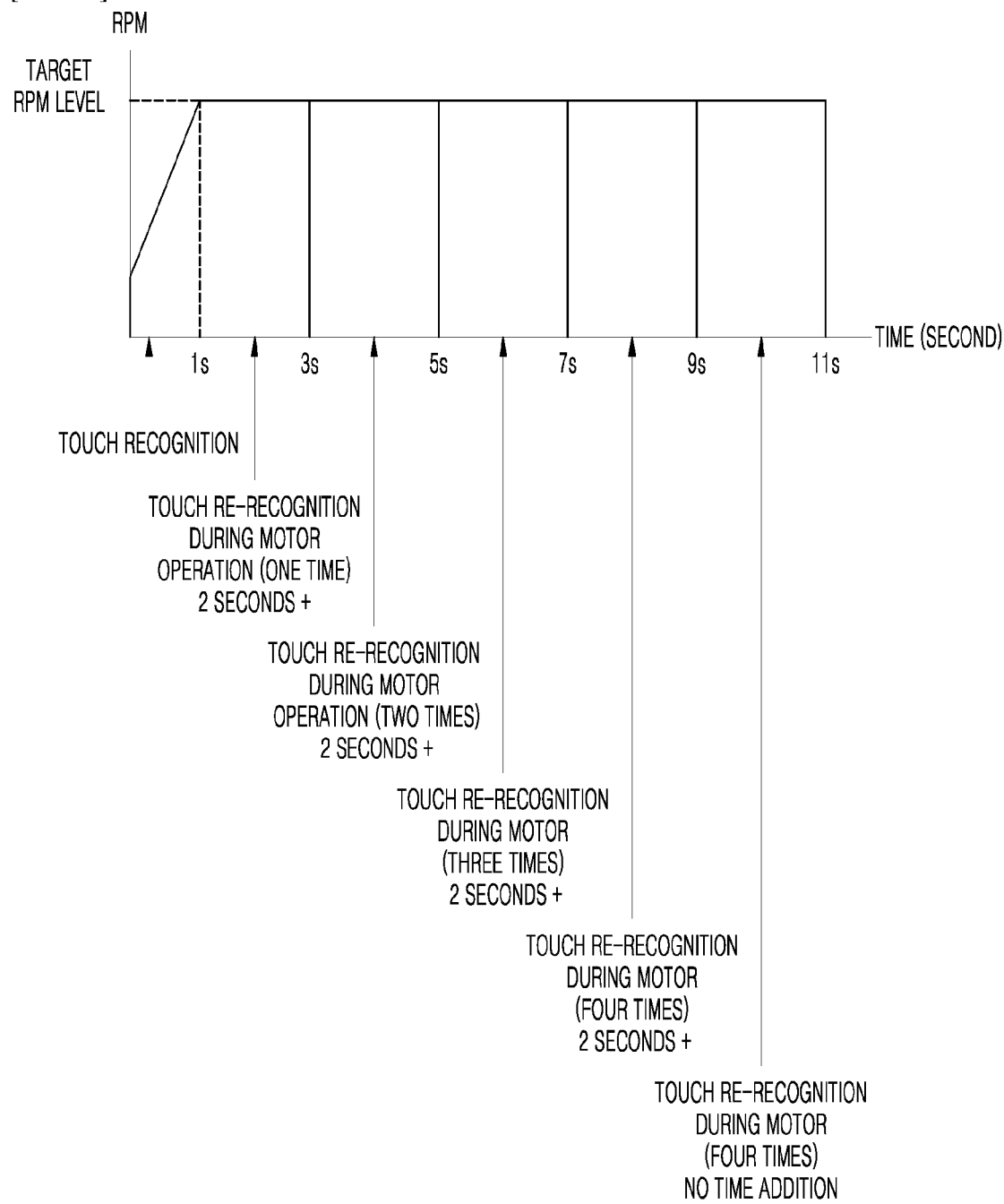

[FIG. 19]
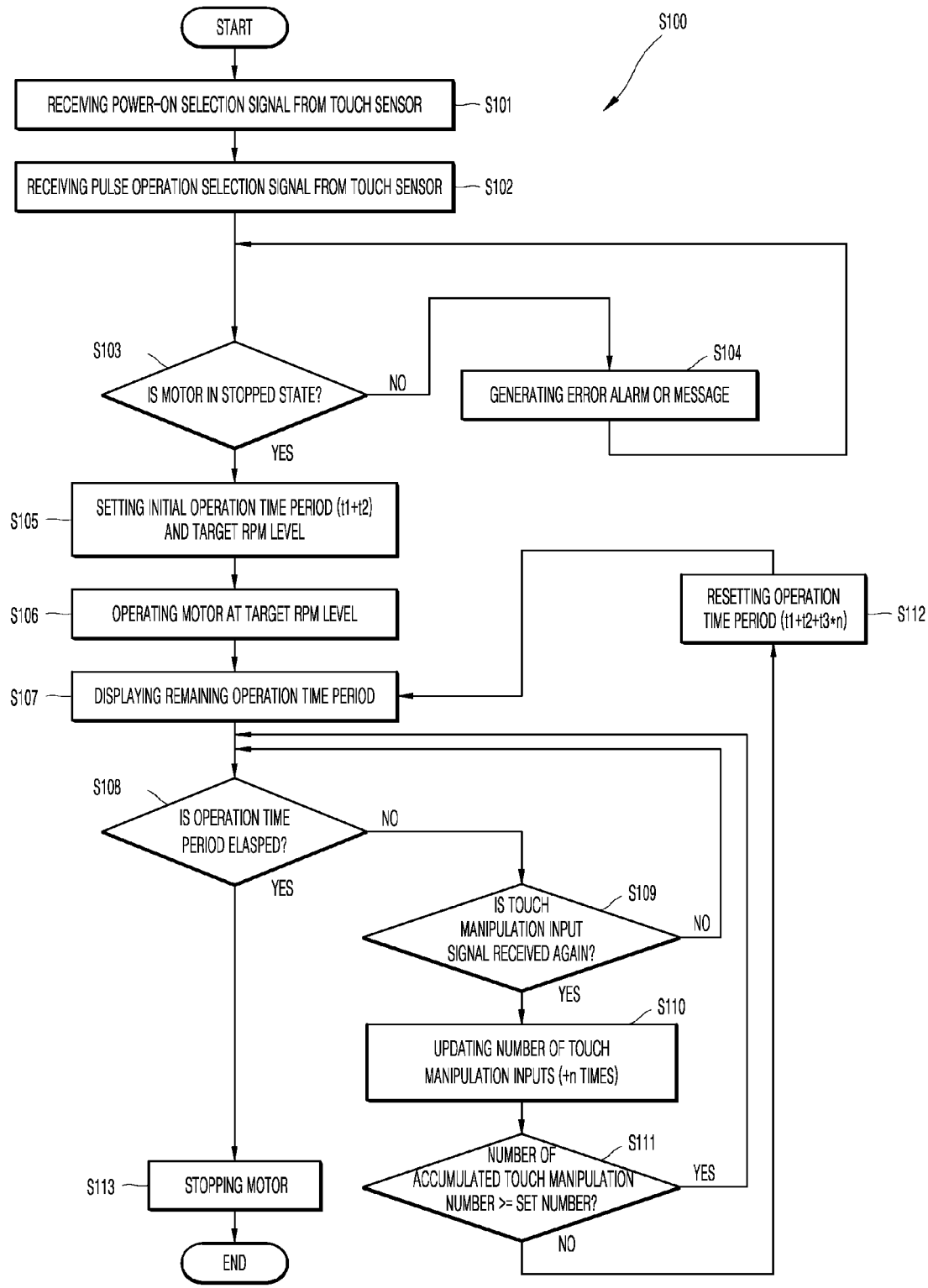

[FIG. 20]
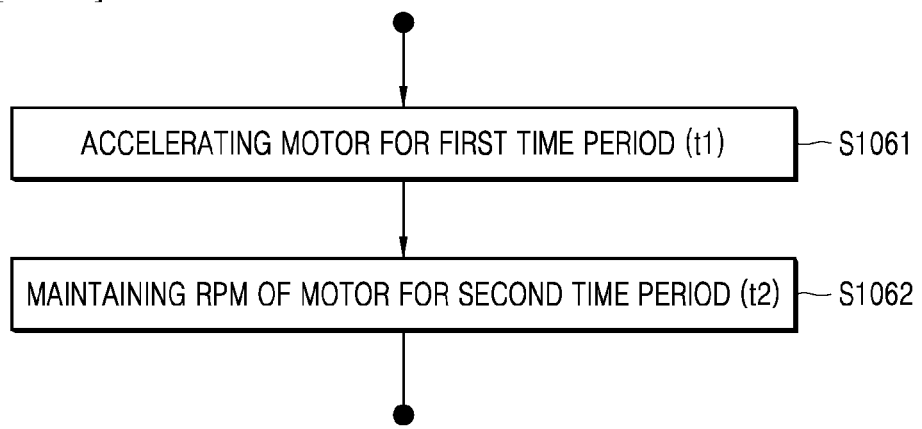

[FIG. 21]
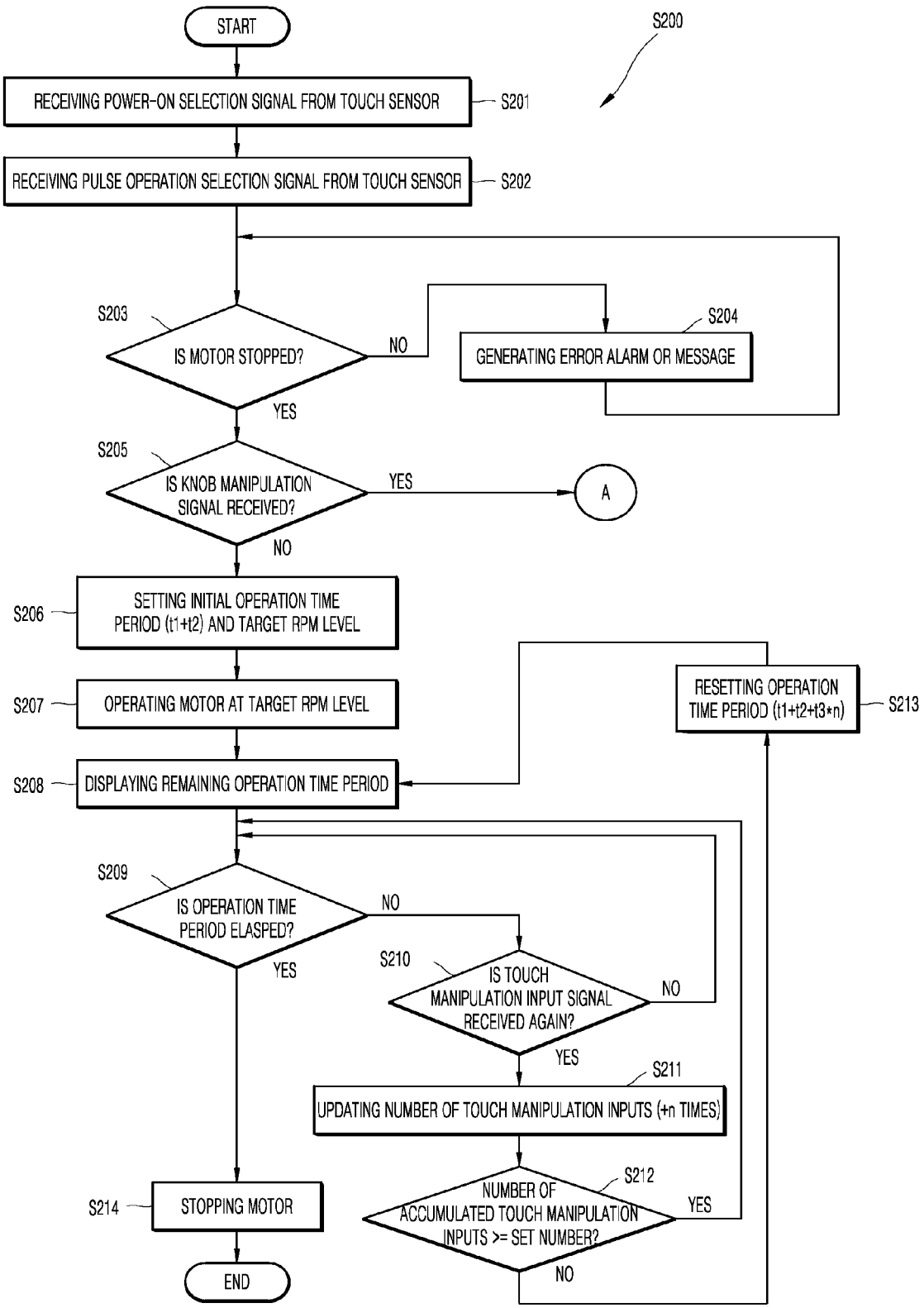

[FIG. 22]
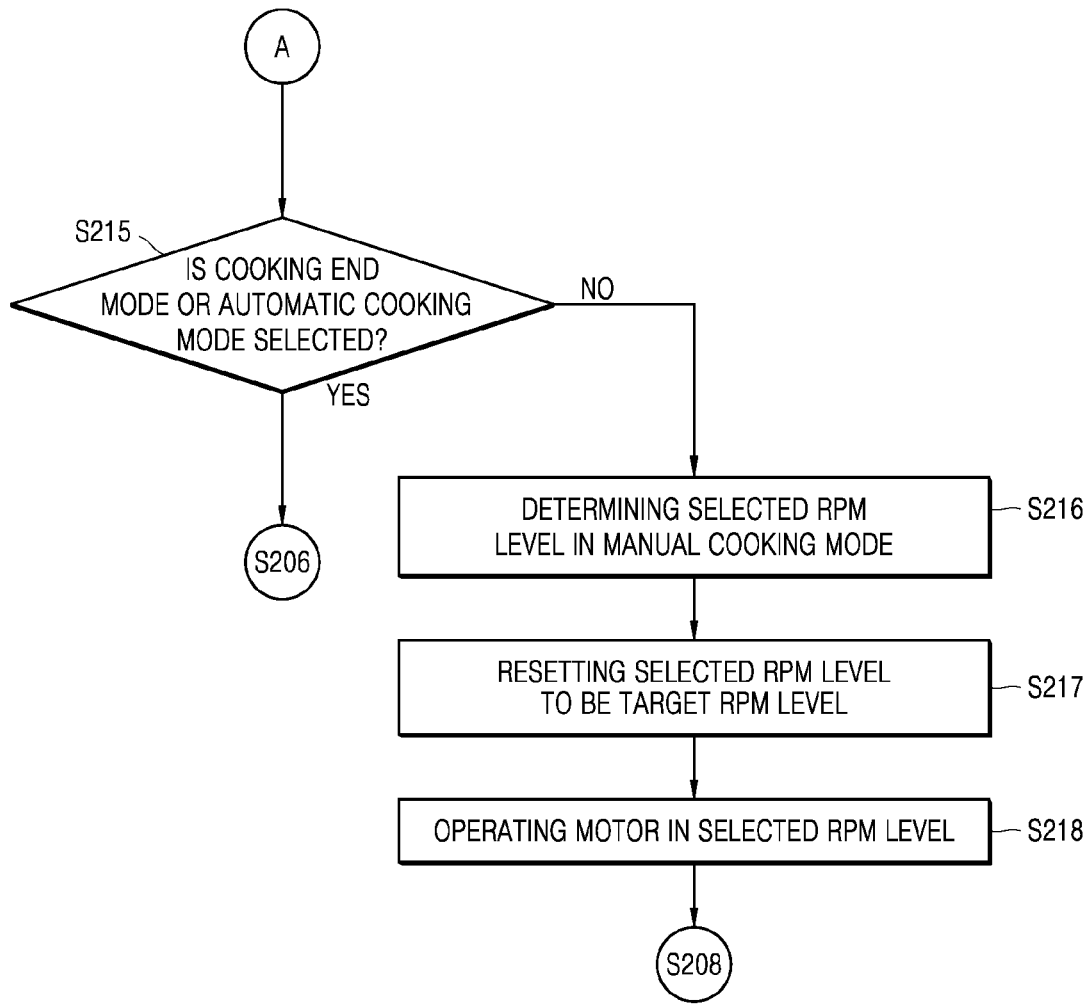

[FIG. 23]
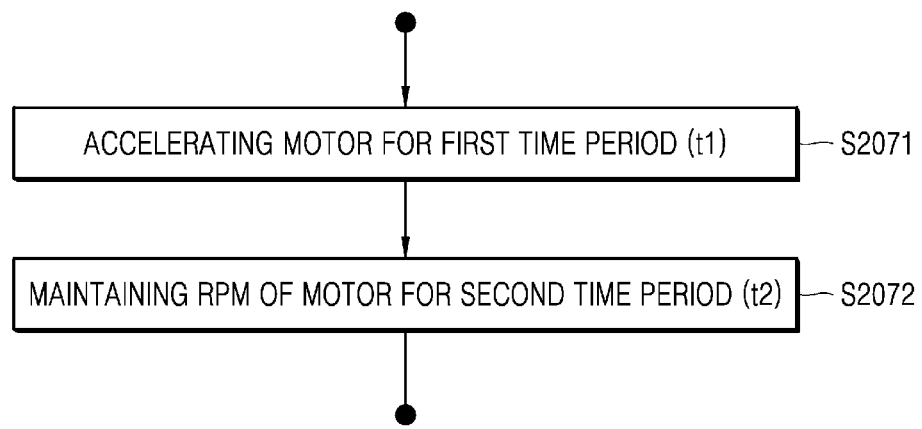

BLENDER

CROSS-REFERENCE TO RELATED APPLICATION

This application claims priority to and the benefit of Korean Patent Application No. 10-2020-0139133, filed on Oct. 26, 2020, which is hereby incorporated by reference as if fully set forth herein.

TECHNICAL FIELD

This disclosure describes a blender, and in particular, a blender capable of adjusting an operation time period of a motor based on a number of touch manipulation inputs.

BACKGROUND

Details in the background section do not constitute the related art but are given only as background information concerning the subject matter of the present disclosure.

A blender, also commonly referred to as a mixer, is a home appliance that cuts food in a container into small pieces, pulverizes the food into powder, and/or turns the food into a liquid state by using a blade rotated by an electric motor.

Generally, a blender includes a container on an upper surface of a main body including a motor and a blade inside the container that is connected to a rotary shaft of the motor when the container is placed on the upper surface of the main body and is rotated by the motor.

A user may drive the motor by manipulating a manipulation button or a knob on the main body after placing the food into the container, and the blender may pulverize the food when the blade is rotated based on the driving of the motor.

Over time, the blender has become larger in capacity with a large-sized container and a motor rotating at a super-high speed to effectively pulverize various types of food. In addition, the blender may be simply manipulated to pulverize the various types of food.

U.S. Pat. No. 10,327,594 discloses a blender including a push-button on a front surface of a base of a container for receiving selection manipulation input by a user.

The push-button may include a power button, a menu selection button, and a pulse mode selection button.

The power button may receive user manipulation to turn on/off the blender, and the menu selection button may receive user manipulation to selecting an operation mode of the blender.

The pulse mode selection button may receive user manipulation for pulse mode operation to operate the motor at a high revolutions per minute (RPM) for a time period desired by the user. Further, the motor may be continuously operated at a predetermined RPM while the user presses the pulse mode selection button by hand, and the motor may be immediately stopped when the user removes the hand from the pulse mode selection button.

The push-button such as the power button, the menu selection button, and the pulse mode selection button each may protrude from the front surface of the blender by a predetermined distance and may be pushed rearward from the front surface of the blender by the user.

However, the protruding push-button may be pressed unintentionally. Particularly, when being pressed with a strong instantaneous force, the push-button or inner components of the base may become damaged.

In addition, a gap may be formed between the push-button and the front surface of the blender due to the structure of the push-button. Thus, food or liquid may be introduced into the main body through the gap when the container overflows during an operation of the blender. Accordingly, foreign substances such as food or liquid introduced through the gap directly into the main body may damage electric components of the blender such as a PCB, thereby causing malfunction or irreversible failure.

SUMMARY OF THE DISCLOSURE

According to an embodiment of the present disclosure, a blender is provided. The blender may include an outer case made of metal and a touch input portion integrated with the outer case and to receive power on-off manipulation and pulse mode selection manipulation. The blender may not include a physical push-button type input means and may not include a gap between the push button and the outer case, thereby effectively preventing component damage and/or failure by an external force and/or introduction of food and improving product reliability.

According to an embodiment of the present disclosure, a blender is provided to operate a motor for a time period desired by a user based on a touch input to a touch input portion that is integrated with an outer case of the blender and to drive the blender in a pulse mode, thereby improving user convenience.

According to an aspect of the present disclosure, the blender may include: a jar including a blade module configured to pulverize or cut and object or food; a main body to place or receive the jar and including a motor configured to rotate the blade module; and a controller disposed inside the main body and configured to operate the motor; the main body may include an outer case made of metal and defining or forming an outer appearance or structure of the main body, the outer case may include a touch input portion on an outer upper surface thereof, a touch sensor may be disposed on an inner lower surface of the outer case at a position corresponding to the position of the touch input portion and may be configured to detect touch manipulation input to the touch input portion, and the controller may be configured to determine an operation time period of the motor based on a number of inputs of the touch manipulation detected by the touch sensor. According to an embodiment of the present disclosure, the blender may prevent forming a gap between the input portion and the case, thereby effectively preventing damage and failure may be caused by introduction of food and may be easily operated in the pulse mode by operating the motor for a time period desired by the user based on a number of simple touch inputs, thereby significantly improving user convenience.

In addition, the controller may be configured to determine whether the operation time period has elapsed after the motor is operated (or begins operation), and based on the determination that the operation time period has elapsed, the controller may be configured to cut off a power supplied to the motor and stop the motor.

In addition, the controller may be configured to set the operation time period and a target RPM level of the motor before the motor may be operated (or begin to operate) and the operation time period may include a first time period for which a current rotation number of the motor may be increased to a predetermined target RPM level and a second time period for which a current rotation speed of the motor may be maintained at the target RPM level after reaching the target RPM level.

In addition, the first time period may be shorter than the second time period and the target RPM level may be a maximum RPM level that may be output by the motor.

In addition, the first time period may be 1 second and the second time period may be 2 seconds.

In addition, the controller may be configured to determine whether the touch manipulation is re-input to the touch input portion using the touch sensor when the operation time period has not elapsed.

In addition, the controller may be configured to, based on the determination that the touch manipulation is re-input to the touch input portion, update a number of accumulated re-inputs by adding the number of accumulated touch manipulation inputs to the touch input portion by a re-input number after the motor is operated (or begins to operate) and determine whether the number of accumulated touch manipulation inputs exceeds a predetermined set number.

In addition, the controller may be configured to, based on the determination that the number of accumulated touch manipulation inputs is less than the predetermined set number, reset the operation time period by extending the operation time period by a time period obtained by multiplying a third time period by the re-input number.

In addition, the third time period may be shorter than a sum of the first time period and the second time period.

In addition, the third time period may be the same as the second time period.

In addition, the controller may be configured to, based on the determination that the number of accumulated touch manipulation inputs is larger than or equal to the predetermined set number, not reset the operation time period.

In addition, the blender may further include: a knob that passes through an outer surface of the outer case and configured to receive rotation manipulation to switch an operation mode of the motor; and a knob sensing sensor configured to detect an amount of rotation of the knob based on the rotation manipulation, the controller may be configured to determine whether manipulation of rotating the knob is input from the knob sensing sensor before operating the motor based on the determination that the touch manipulation is input to the touch input portion.

In addition, the controller may be configured to, based on the determination that the manipulation of rotating the knob is input, determine a cooking (or operation) mode selected based on information on the amount of rotation of knob received from the knob sensing sensor.

In addition, the controller may be configured to, based on the determination that the cooking mode selected based on the amount of rotation of the knob is a cooking end mode or an automatic cooking mode, set a maximum RPM level that may be output by the motor to be the target RPM level.

In addition, the controller may be configured to, based on the determination that the cooking mode selected based on the amount of rotation of the knob is a manual cooking mode, determine an RPM level selected based on the amount of rotation of the knob received from the knob sensing sensor after the manual cooking mode is selected.

In addition, the controller may be configured to set the selected RPM level to be the target RPM level.

In addition, the touch input portion may be integrated with the outer case.

According to an embodiment of the present disclosure, the blender may include an outer case made of metal and a touch input portion integrated with the outer case and to receive power on-off manipulation and pulse mode selection manipulation, but may not include a physical push button type input means and may not define a gap between the push button and the outer case, thereby effectively preventing component damage due to an external force and damage and/or failure caused by introduction of food and improving product reliability.

In addition, according to the present disclosure, the blender may operate a motor for a time period desired by the user based on a simple touch input to the touch input portion that may be integrated with the outer case and may be operated in the pulse mode, thereby improving user convenience.

In addition to the above-described effects, further effects of the present disclosure are described together while explaining specific matters to carry out the disclosure below.

Aspects, features, and advantages of the present disclosure are not limited to those described above. It is understood that other aspects, features, and advantages not mentioned above can be clearly understood from the following description and can be more clearly understood from the embodiments set forth herein. Additionally, it is understood that various aspects, features, and advantages described herein can be realized via means and combinations thereof that are described in the appended claims.

BRIEF DESCRIPTION OF THE DRAWINGS

The accompanying drawings constitute a part of the specification, and illustrate one or more embodiments in the disclosure, and together with the specification, explain the disclosure:

FIG. 1 is a front view of an example blender according to an embodiment of the present disclosure;

FIG. 2 is a perspective view of the blender according to an embodiment shown in FIG. 1;

FIG. 3 is a longitudinal cross-sectional view of the blender according to an embodiment shown in FIG. 1;

FIG. 4 is a perspective view of a main body according to an embodiment shown in FIG. 1;

FIG. 5 is a cross-sectional view of the main body taken along line V-V' according to an embodiment shown in FIG. 4;

FIG. 6 is an exploded perspective view of the main body according to an embodiment shown in FIG. 4 when viewed from top;

FIG. 7 is an exploded perspective view of the main body according to an embodiment shown in FIG. 4 when viewed from bottom;

FIG. 8 is an exploded perspective view of components defining an outer appearance of the main body according to an embodiment shown in FIG. 4;

FIG. 9 is an exploded perspective view of a touch module and a display module coupled to an inner case according to an embodiment shown in FIG. 8;

FIG. 10 is a perspective view of the inner case according to an embodiment shown in FIG. 9 when viewed from bottom;

FIG. 11 is a bottom view of an inside of a main body when a touch module and a display module are coupled to the main body according to an embodiment of the present disclosure;

FIG. 12 is a cross-sectional view taken along line XIII-XIII' of FIG. 2 according to an embodiment of the present disclosure;

FIG. 13 is an exploded perspective view showing an arrangement relationship between the inner case and a PCB module according to an embodiment shown in FIG. 8;

FIG. 14 is an exploded perspective view of a knob according to an embodiment shown in FIG. 13 when viewed from the front in one direction;

FIG. 15 is a functional block diagram of example components of a controller of a blender according to an embodiment of the present disclosure;

FIG. 16 is a graph showing a touch sensing by a touch sensor according to an embodiment shown in FIG. 15;

FIGS. 17 and 18 are graphs showing an example operation of a blender in a pulse mode according to an embodiment of the present disclosure;

FIGS. 19 and 20 are flowcharts of a method for controlling a blender according to a an embodiment of the present disclosure; and FIGS. 21 to 23 are flowcharts of a method for controlling a blender according to a another embodiment of the present disclosure.

DETAILED DESCRIPTION

Some embodiments of the present disclosure are described in detail with reference to accompanying drawings. Therefore, a person having ordinary knowledge in the art to which the present disclosure pertains is able to easily embody the technical idea of the present disclosure. A detailed description of a well-known technology relating to the present disclosure may be omitted if it unnecessarily obscures the gist of the present disclosure. Hereinafter, one or embodiments of the present disclosure are described in detail with reference to the accompanying drawings. Same reference numerals may be used to refer to same or similar components.

Terms such as first, second, and the like may be used herein to describe elements of the present disclosure. These elements are not limited by these terms. These terms are intended to distinguish one element from another element. A first element may be a second element unless otherwise stated.

Unless otherwise stated, each component may be singular or plural throughout the disclosure.

In this document, the terms "upper," "lower," "on," "under," or the like are used such that, where a first component is arranged at "an upper portion" or "a lower portion" of a second component, the first component may be arranged in contact with the upper surface or the lower surface) of the second component, or another component may be disposed between the first component and the second component. Similarly, where a first component is arranged on or under a second component, the first component may be arranged directly on or under (in contact with) the second component, or one or more other components may be disposed between the first component and the second component.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

In some examples, singular expressions used in the present disclosure include plural expressions unless the context clearly indicates otherwise. In the present disclosure, terms such as "including" or "comprising" should not be construed as necessarily including all of the various components, or various steps described in the present disclosure, and terms such as "including" or "comprising" should be construed as not including some elements or some steps or further including additional elements or steps.

In the present disclosure, unless otherwise stated, "A and/or B" means A, B or A and B. Unless otherwise stated, "C to D" means "C or more and D or less".

Various terminology used herein can imply direct or indirect, full or partial, temporary or permanent, action or inaction. For example, when an element is referred to as being such as "including" or "comprising" should not be construed as necessarily directly on, connected or coupled to the other element or intervening elements can be present, including indirect or direct variants. In contrast, when an element is referred to as being "directly connected" or "directly coupled" to another element, there are no intervening elements present.

Hereinafter, a blender and a method for controlling the blender according to embodiments of the present disclosure are described.

FIG. 1 is a front view of an example blender. FIG. 2 is a perspective view of the blender in FIG. 1. FIG. 3 is a longitudinal cross-sectional view of the blender in FIG. 1.

Components of the blender according to the present disclosure are described with reference to FIGS. 1 to 3 hereinafter.

As shown in FIGS. 1 to 3, a blender 1 according to an embodiment of the present disclosure includes a main body 30 disposed on a surface and a jar 10 detachably disposed on the main body 30.

Hereinafter, a position at which a knob 40 is disposed is referred to as the front surface or the front, and a portion where a power connector 35 (see FIG. 6) is connected is referred to as the rear surface or the rear. In addition, the position at the lower surface of the main body 30 is referred to as the lower surface or the lower side, the left side of the knob 40 is referred to as the left surface or the left side, and the right side of the knob 40 is referred to as the right surface or the right side.

Electrical devices and components such as a motor assembly 50 and a printed circuit board (PCB) module 60 may be disposed in the main body 30 to operate the blender 1.

In addition, a knob 40 and a touch input portion 319 may be provided to receive input and to manipulate the operation of the blender 1, and a display 318 may indicate an operation state thereof.

The main body 30 may have a hexahedral shape (or a cubical shape and not limited thereto) and may include a seating portion 301 on the upper surface of the main body 30 thereof to place the jar 10. The jar 10 may be detachably coupled to the seating portion 301 in a vertical direction.

An outer case 31 may define an structure of the main body 30, and may be made of metal or has a metal texture, but not limited thereto.

The outer case 31 may have a hexahedral shape (or a cubical shape and not limited thereto) with the lower surface defining an opening. An inner case 32 may be disposed inside the outer case 31 and may provide an installation space to accommodate the motor assembly 50 and the PCB modules 60 (later shown in detail in FIG. 6).

The knob 40 may be disposed on the front surface of the main body 30 and may be configured to set an operation of the blender 1 based on a user input or manipulation.

The knob 40 may protrude from the front surface of the main body 30 and may manipulate or change and set the operation setting of the blender 1 corresponding to the rotation of a motor 51. An exemplary configuration of the knob 40 in accordance with an embodiment of the present disclosure is later described in detail below with reference to FIGS. 13 and 14.

A bottom cover 74 may be disposed under the main body 30. The bottom cover 74 may be detachably coupled to the outer case 31 and the inner case 32 and may contact the surface on which of the blender 1 may be disposed.

In addition, the bottom cover 74 may include space between the surface and the outer case 31 and the inner case 32, as shown in FIG. 3 for example. The bottom cover 74 may be configured to house a cover suction inlet 744b to suck or communicate cooling air to inside of the main body 30 and a cover discharge outlet 746b to discharge or communicate cooling air to outside of the main body 30.

The main body 30 may include a display 318 on the upper surface thereof to indicate an operation state of the blender 1.

For example, the display 318 may be configured as at least one or more, seven-segment displays as shown in FIG. 2 for example.

The display 318 may have a combination of through-holes that may extend into inside of the outer case 31.

The through-holes may be defined or disposed at positions corresponding a plurality of light emitting diodes (LEDs) provided in a display module 66 (later described in detail below), and a plurality of LEDs may be combined to form a letter or a number. The display 318 may display different letters or numbers depending on a lighting state of the LED.

In addition, each of the through-holes may be filled with a hole filling member. The hole filling member may be made of, for example, transparent resin such as silicone and acrylic, but not limited thereto, and may be made of light-transmissive material to transmit the light generated from the LEDs. In addition, the hole filling member may prevent food or foreign substances produced during a cooking process of the blender 1 from being attached to the outer case 31 or being inserted (or seeped) into the through-hole.

The main body 30 may include a touch input portion 319 on the upper surface thereof to manipulate the operation of the blender 1. For example, the touch input portion 319 may include a pulse mode selector 319a and an on-off selector 319b.

The touch input portion 319 may be arranged side-by-side to the display 318. That is, the touch input portion 319 may be arranged adjacent to the display 318 for a user to recognize or view the touch input portion 319 and the display 318 together at a glance when the user wants to manipulate the touch input portion 319.

The touch input portion 319 may be provided at a position corresponding to touch sensor 654 of the touch module 65. For example, the touch input portion 319 may be formed by being printed on the outer case 31 or by a surface-processing such as etching. In addition, the touch input portion 319 may be formed by attaching a film. The touch input portion 319 may be configured to induce a user to touch an appropriate position that may be detected by the touch sensor 654 during a user a manipulation (or input) operation.

The touch input portion 319 may not protrude from the outer surface of the main body. The touch input portion 319 may be integrated with the outer case 31 in one embodiment of the present disclosure, thereby significantly reducing a possibility of damage thereof due to an external force. Additionally, in an embodiment the present disclosure, since a gap of a is reduced or illuminated, introduction of the foreign substances such as the food may be prevented through the touch input portion 319 of the present disclosure.

The seating portion 301 may be disposed on the upper surface of the main body 30. The seating portion 301 may protrude from the upper surface of the main body 30 and a portion of the seating portion 301 may be inserted into the lower surface of the jar 10 to stably or firmly support the jar 10. In one example, when the jar 10 is placed on the seating portion 301, the motor assembly 50 is coupled to the blade module 14 inside the jar 10 to transmit a rotational force to the blade module 14.

The seating portion 301 may be provided at an eccentric side from a center of the main body 30, as shown in FIGS. 1 and 2.

The overall horizontal length including a handle 13 of the jar 10 may correspond to the horizontal length of the main body 30, as shown in FIG. 1 for example. The center of a food receiving space of the jar 10 may be disposed eccentric from the center of the main body 30 and a center of the seating portion 301 may also be disposed on the same vertical axis as the center of the jar 10. In addition, the knob 40 may be provided at a position corresponding to the center vertical axis of the seating portion 301 and the jar 10 and may be disposed at an eccentric side of the front surface of the main body 30.

The seating portion 301 may be made of the same material as the outer case 31 and may define a part of an overall outer structure of the blender 1. The seating portion 301 may be made of metal or material with a metal texture, but not limited thereto, and be configured to have an structure that is consistent with the main body 30, as shown in FIGS. 1 and 2 for example.

The motor assembly 50 may be disposed inside the main body 30 under the seating portion 301. The motor assembly 50 rotates the blade module 14 inside the jar 10 and may be rotated at a high speed. In addition, in a manual cooking mode, the motor assembly 50 adjusts a rotation speed according to a revolutions per minute (RPM) level selected based on the rotation of the knob 40. The configuration of the motor assembly 50 is further describe in later in detail thereof.

The upper surface of the motor assembly 50 may be connected to the blade module 14 inside the jar 10. The motor assembly 50 may include a cooling fan 55 at a lower portion thereof and may rotate together with the blade module 14 when the motor assembly 50 is driven to force flow of cooling air inside the main body 30.

A plurality of PCB modules 60 may be disposed on inner walls of the inner case 32, which forms the inner surfaces of the main body 30. The plurality of PCB modules 60 may be provided and may be disposed at the perimeter of the inner surfaces of the main body 30. For example, each corresponding one of the plurality of PCB modules 60 may be arranged on or near the front surface, the rear surface, the left surface, and the right surface of the main body 30, as shown in FIG. 13 for example.

Further, the open lower surface of the inner case 32 may be closed by the base plate 71. The base plate 71 may include an air guide 72 to guide discharge of cooling air suctioned by the cooling fan 55.

A predetermined space may be defined or provided between the base plate 71 and the bottom cover 74, and a wireless power module 73 may be disposed between the base plate 71 and the bottom cover 74. The wireless power module 73 may supply power to the motor assembly 50 in a wireless manner using an induced electromotive force.

The jar 10 may have a cylindrical shape with an outer diameter corresponding to that of the seating portion 301, defining or providing an opening at an upper side and a food receiving space 101 thereof.

The jar 10 may be made of material such as glass, tritan, and/or transparent plastic, but not limited thereto, to identify the state of the food inside the jar 10 during the operation of the blender 1. In addition, the jar 10 may include an outer jar 11 configure to define or provide an outer shape of the jar 10, and an inner jar 12 providing an inner space to receive the food.

The inner jar 12 and the outer jar 11 may be coupled to each other to form the shape of the jar 10, and the jar 10 may have a double wall structure.

In addition, the outer jar 11 has a cylindrical shape with an outer diameter of an upper side thereof being the same as a lower side thereof and may define a consistent or uniform structure of the jar 10. In addition, the outer diameter of the outer jar 11 may be the same as the outer diameter of the seating portion 301 such that the main body 30 and the jar 10 have a consistent or uniform structure when the jar 10 is disposed on the seating portion 301.

A main body accommodator may be disposed on the lower surface of the outer jar 11.

The main body accommodator may be recessed from the lower surface of the outer jar 11 in an upward direction and may be configured to receive a second seating portion 325 (later described in detail below). In one example, the jar 10 may be placed on the seating portion 301 by coupling between the main body accommodator and the second seating portion 325.

The blade module 14 may be disposed at the center of the inner bottom surface of the jar 10. The blade module 14 includes a plurality of blades 141 and may be connected to the motor assembly 50. For example, when the motor assembly 50 is driven with the jar 10 placed on the main body 30, the blade 141 is rotated to pulverize (or grind) or cut the food inside the jar 10.

In addition, the jar 10 may include a plurality of inner guides 121 to guide the rotating food. The inner guide 121 may extend from the bottom of the inner surface of the jar 10 in an upward or vertical direction by a predetermined length and may extend to the lower surface of a lid 20 when the lid 20 is placed.

A spout 111 may protrude from a first side of an upper end of the jar 10 to pour the pulverized or ground food. A handle 13 may protrude from a second side of the jar 10 opposite to the first side at which the spout 111 is disposed.

The handle 13 may protrude outward from the upper end of the jar 10 and may extend downward to allow the user to lift or move the jar 10. The protrusion of the handle 13 may be provided in a substantially the same vertical axial direction as the side surface of the main body 30.

In addition, the lid 20 may be detachably coupled to a top opening disposed at or near the upper surface of the jar 10 and may be configured to close the top opening of the jar 10. The user may separate the lid 20 from the jar 10 while holding the lid handle 13 to open and close the top opening of the jar 10. For example, the lid 20 may include a lid upper portion 22, a lid lower portion 23, and a lid handle 221, and the lid 20 may include a lid gasket 24 disposed along or adjacent the circumference of the lid 20.

FIG. 4 is a perspective view of the main body 30 according to an embodiment in FIG. 1. FIG. 5 is a cross-sectional view taken along line V-V' according to an embodiment in FIG. 4. FIG. 6 is an exploded perspective view of the main body 30 according to an embodiment in FIG. 4 when viewed from top. FIG. 7 is an exploded perspective view of the main body 30 according to an embodiment in FIG. 4 when viewed from bottom. FIG. 8 is an exploded perspective view of components defining an outer structure of the main body 30 according to an embodiment in FIG. 4.

As shown in FIGS. 4 to 7, the main body 30 has a rectangular box or cubical shape, and a seating portion 301 may be disposed on the upper surface of the main body 30 to receive or mount the jar 10. The knob 40 may be disposed on the front surface of the main body 30 to facilitate manipulation of an operation of the blender 1.

In addition, the inner case 32 may define an inner structure of the main body 30, and an outer case 31 may be disposed outside of the inner case 32 and may define an outer structure of the main body 30.

The inner case 32 may be injection molded with plastic to facilitate placing or mounting of the inner components and the outer components of the main body 30.

In addition, the outer case 31 may be made of metal such as stainless steel, but not limited thereto, and may be formed by bending and joining a plate-shaped material, thereby defining a uniform and robust structure. The outer case 31 may have a hexahedral or cubical shape with an opening at or near the lower surface thereof, and may define an outer structure of the main body 30, and the inner case 32 may be disposed inside of the outer case 31 and may be configured to accommodate a plurality of components.

Each of the outer case 31 and the inner case 32 may have an opening at or near the lower surface thereof and may be configured to accommodate a motor assembly 50 and a plurality of PCB modules 60. In addition, a base plate 71 may be configured to close the opening at or near the lower surface of the inner case 32 and a bottom cover 74 may be configure to form the lower surface of the main body 30.

An exemplary structure of the main body 30 is described in detail hereinafter. The outer case 31 may include a quadrilateral or rectangular upper surface, a front surface, a rear surface, a left surface, and a right surface that extend downward along the perimeter of the upper surface thereof.

The outer case 31 may define an opening 311 on the upper surface thereof. An outer diameter of the opening 311 may be substantially the same as or slightly larger than that of the seating portion 301. Accordingly, when the inner case 32 and the outer case 31 are coupled to each other, for example, an upper portion of the inner case 32 forming the seating portion 301 may be exposed outside of the outer case 31 through the opening 311.

A first seating portion decoration 314, a second seating portion decoration 316, a lower decoration 315, and a connecting decoration 317 may be disposed at an upper portion of the inner case 32 that protrudes outward from the outer case 31.

The first seating portion decoration 314, the second seating portion decoration 316, the lower decoration 315, and the connecting decoration 317 may define an outer structure of the seating portion 301. The first seating portion decoration 314 and the second seating portion decoration 316 may be made of the same material as the outer case 31 or material with the same texture as the outer case 31 to provide a uniform and integral form.

The first seating portion decoration 314 and the second seating portion decoration 316 each have a ring shape with a predetermined height. In one embodiment, the first seat portion decoration 314 and the second seating portion decoration 316 may have different heights. The first seating portion decoration 314 may have a larger diameter than the second seating portion decoration 316, and the connecting decoration 317 may be connected to the upper surface of the first seating portion 324 and the second seating portion decoration 316 and may have a ring shape.

In addition, the first seating portion decoration 314, the second seating portion decoration 316, and the connecting decoration 317 may be disposed on an outer surface of the first seating portion 324 and the second seating portion 325 of the inner case 32, and an upper surface of the first seating portion 324.

The second seating portion 325 may extend from the upper surface of the first seating portion 324 in an upward vertical axis direction and may provide an insertion space 325a to accommodate a jar coupler disposed in a blade module mounting portion.

A jar coupling protrusion 325b and a jar coupling groove 325c may be provided in the inner surface of the insertion space 325a and may be coupled to the jar coupler that protrudes from the bottom surface of the jar 10. In addition, a plurality of jar coupling protrusions 325b and jar coupling grooves 325c may be disposed along the inner surface of the second seating portion 325 in an alternating manner, as shown in FIG. 4. For example, when the jar 10 is placed on the seating portion 301, the jar coupler may be coupled or mounted at a fixed position corresponding to the jar coupling protrusion 325b and the jar coupling groove 325c.

In addition, the outer case 31 may include a knob hole 312 on the front surface thereof through which the knob 40 passes through. The knob 40 may protrude forward from the main body 30 through the knob hole 312.

In addition, the outer case 31 may include a recessed plate groove 313 on the rear surface thereof to accommodate a rear plate 34.

In addition, a communication module 36 may be disposed on the inner rear surface of the inner case 32.

In addition, a power connector 35 may be inserted into an opening on the plate groove 313 to supply power to the main body 30 and may pass through an opening on the rear plate 34, as show in FIG. 7 for example.

The inner case 32 may have a box or cubical shape, and may include an opening at the lower surface thereof, and the seating portion 301 may be disposed above the inner case 32.

The inner case 32 may have a flat upper surface, the front surface, the rear surface, the left surface, and the right surface that extend downward in a vertical direction along the perimeter of the upper surface thereof.

The inner case 32 may be made of a plastic material, may be molded to have various suitable shapes, and may accommodate the motor assembly 50 and the PCB modules 60.

The inner case 32 may include a knob mounting hole 321 on the front surface thereof. The knob mounting hole 321 may be an opening configure to receive the knob 40 placed on the main PCB module 64 and may be disposed at the rear side of the knob hole 311.

A mounting portion 322 may be disposed on the upper surface of the inner case 32. The mounting portion 322 may be recessed to facilitate accommodating or mounting of the display module 66 and the touch module 65. The mounting portion 322 may define or form a step, and the display module 66 and the touch module 65 may be covered or closed by the outer case 31 when the display module 66 and the touch module 65 are disposed on the mounting portion 322.

The motor assembly 50 may be disposed in the inner space of the inner case 32. The motor assembly 50 generates a rotational force of the blade module 14 and may be disposed under the center portion of the seating portion 301.

The motor assembly 50 may include a motor 51 having a motor shaft 53 that extends along a vertical axis, a motor housing 52 configured to accommodate the motor 51, a motor connector 54 disposed on an upper surface of the motor shaft 53, and a cooling fan 55 disposed on a lower surface of the motor shaft 53.

The motor connector 54 may be disposed on the upper surface of the motor shaft 53 and may be coupled to the blade module 14 when the jar 10 is placed, for example, on the seating portion 301. The motor connector 54 may be coupled to the blade module 14 to transmit the rotational force generated by the motor 51 to the blade module 14. The motor connector 54 may be exposed through the upper surface of the inner case 32 and may be disposed at or near the center of the insertion space 325a inside the seating portion 301.

The cooling fan 55 may be exposed outside of the motor housing 52 and may be accommodated inside an air guide 72, further described in detail below. Accordingly, when the cooling fan 55 is operated, air that passes through the motor housing 52 may be guided to inside of the air guide 72.

In addition, air flow may be generated inside the main body 30 based on the driving of the cooling fan 55, and in particular, at least some of the PCB modules 60 disposed outside of the motor housing 52 may be provided in the path of air flow that is generated based on the driving of the cooling fan 55 to be cooled together.

The inner case 32 may be configured to accommodate a plurality of PCB modules 60 configured to operate the blender 1. The PCB modules 60 may be disposed on the inner surfaces of the inner case 32.

As shown in FIGS. 6 and 7, the PCB modules 60 may include a plurality of PCB modules having different functions may be arranged next to the walls of the inner case 32 and at positions adjacent to the inner surfaces of the inner case 32.

That is, the PCB modules 60 may surround the motor assembly 50 at the outside of the motor assembly 50. For example, when the motor assembly 50 rotates, the PCB modules 60 may be provided in the air flow path passing through the motor assembly 50, and the PCB module 60 may be air-cooled as a result. In this example, the air flow may be concentrated or directed to a PCB having a high exothermic temperature among the PCB modules 60, thereby effectively or appropriately dissipating heat or cooling air.

In one embodiment of the present disclosure, the PCB modules 60 may include a main PCB module 64, an inverter PCB module 61 to control the motor 51, a power PCB module 62 to control an input power, and a filtering PCB module 63 to remove noise.

Additional PCB modules may be provided or one or more of the PCB modules 60 may be omitted based on the functionality of the blender 1. The present disclosure is not limited thereto, but as shown in the figures, the PCB modules 60 including the main PCB module 64, the inverter PCB module 61, the power PCB module 62, and the filtering PCB module 63 is described below hereinafter.

The main PCB module 64 may include a controller (see FIG. 15) to control the overall operation of the blender 1, for example, the controller may facilitate the knob 40 to receive a manipulation input.

The main PCB module 64 may be disposed on the inner front surface of the inner case 32 corresponding to the position of the knob 40. The main PCB module 64 may be electrically connected to the display module 66 and the touch module 65.

The main PCB module 64 may transmit operation information of the blender 1 to the display module 66 and may receive a touch signal input to the touch module 65 when a user manipulates the touch module 65.

The power PCB module 62 may function as a power converter to supply power to the inside of the blender 1 and may be disposed on the inner rear surface of the inner case 32 where the power connector 35 may be disposed.

The power PCB module 62 may be referred to as a switching mode power supply (SMPS). The power PCB module 62 may change a state of the power received from the power connector 35 to a stable state to drive the blender 1 and may supply the power in the stable state. In addition, the power PCB module 62 may receive power from the wireless power module 73 when the blender 1 is used wirelessly, and similarly, the power PCB module 62 may change the state of power to a stable state to drive the blender 1 and to supply the power in the stable state.

The inverter PCB module 61 may function as a motor controller to control a rotation speed or a number of rotations of the motor 51, and may control the rotation speed of the motor 51 to be variable according to user manipulation or input.

The inverter PCB module 61 may generate heat having a high temperature during operation based on the operation property thereof, and thus, may require intensive or fast cooling. For example, the inverter PCB module 61 may include a heat dissipation member 612 (see FIG. 13) on the inner surface of the inner case 32 corresponding to the position of the plate suction inlet 719a to achieve the intensive or fast cooling.

The filtering PCB module 63 may be electrically connected to the power PCB module 62 and may remove a power frequency noise output from the power PCB module 62. In addition, the filtering PCB module 63 may be disposed on one side of the inner surface of the inner case 32 facing the inverter PCB 611.

The main PCB module 64 may face the power PCB module 62 and the inverter PCB module 61 may face the filtering PCB module 63. For example, four surfaces, that is, the front surface, the rear surface, the left surface, and the right surface of the PCB modules 60 may surround the motor assembly 50 and the motor assembly 50 may be disposed in the PCB modules 60.

The base plate 71 may be disposed at a lower side of the inner case 32. The base plate 71 may be configured to close the opening at or near the lower surface of the inner case 32 and may support one or more of the components inside the inner case 32.

The base plate 71 may have a plate shape corresponding to the shape of the opening at or near the lower surface of the inner case 32. In addition, the perimeter of the base plate 71 may be coupled to the lower side of the inner case 32 to close the perimeter of the base plate 71 and the lower side of the inner case 32.

In addition, the base plate 71 may define a plate suction inlet 719a and a plate discharge outlet 719b provided at both left and right sides thereof. The plate suction inlet 719a may be defined along a first side of the base plate 71 and may provide a path through which cooling air may be introduced into the inner case 32 when the motor assembly 50 is driven. In addition, the plate discharge outlet 719b may be defined along a second side of the base plate 71 and may provide a path through which the cooling air inside the inner case 32 may be discharged to the outside of the inner case 32.

The air guide 72 may be disposed on the upper surface of the base plate 71. The air guide 72 may be disposed under the motor assembly 50 and may connect a housing lower hole 523 to the plate discharge outlet 719b to guide the discharge of the air that has cooled the motor while passing through the motor assembly 50. That is, the air guide 72 may provide an independent air flow space that extends from the motor assembly 50 to the discharge outlet.

The air guide 72 may support the lower surface of the motor housing 52 and may be configured to accommodate the cooling fan 55. For example, when the cooling fan 55 rotates, the air passing through the motor housing 52 may flow along the air guide 72.

In addition, the air guide 72 may include an open guide hole 721 on an upper surface thereof. For example, when the bottom plate 71 is coupled to the inner case 32, the lower surface of the motor assembly 50 may be disposed at or near the circumference of the guide hole 721 and the cooling fan 55 may be inserted through the guide hole 721.

A wireless power module 73 may be disposed on a lower surface of the base plate 71. The wireless power module 73 supplies wireless power to the blender 1, and may include a plurality of ferrite cores and coils to receive power using an induced electromotive force. Accordingly, the wireless power module 73 may receive power supply by the induced electromotive force when the user wishes or selects to use the blender 1 wirelessly.

The bottom cover 74 may be disposed below the base plate 71. The bottom cover 74 forms the lower surface of the main body 30 and may close the opening at or near the lower surface of the outer case 31. In addition, when the wireless power module 73 is placed on the base plate 71, the wireless power module 73 may be closed by the bottom cover 74.

The bottom cover 74 may have a plate shape with a size corresponding to the open lower surface of the outer case 31, and the perimeter of the bottom cover 74 may extend upward and may be coupled to the lower side of the outer case 31. In addition, the bottom cover 74 may define a cover suction inlet 744b and a cover discharge outlet 746b to introduce the external air and discharge the heat-dissipated air from the inside of the main body 30.

Hereinafter, the structures of the display module 66 and the touch module 65 and mounting structures thereof are described in detail.

Referring to FIGS. 9 to 13, the inner case 32 may include a hexahedral or cubical shape with an opening at or near lower surface. The inner case 32 may be inserted through the opening at or near the lower surface of the outer case 31 and may be completely accommodated or housed in the outer case 31.

In addition, the first seating portion 324 and the second seating portion 325 may be disposed on the inner case 32, may protrude upward, and may define a stepped portion.

In addition, a sensing device accommodator 329 may accommodate a sensing device 39 to detect the jar 10 at a position corresponding to the second seating portion 325. The sensing device 39 may be provided at a position corresponding to the inner surface of the second seating portion 325 and a plurality of sensing devices 39 may be disposed radially with respect to the center of the second seating portion 325.

In addition, the inner case 32 may include a structure for coupling to the base plate 71 to close the opening at or near the lower surface of the inner case 32. The structure for coupling the inner case 32 to the base plate 71 is described hereinafter. The inner case 32 may include a plurality of bosses 371, 375, and 376 for coupling to the base plate 71. The plurality of bosses 371, 375, and 376 that may extend toward the opening at or near the lower surface thereof from the upper surface of the inner portion of the inner case 32.

The inner case 32 may include the mounting portion 322 on the upper surface thereof. The mounting portion 322 may be include a stepped or recessed structure beginning from an edge of one side of the upper surface of the inner case 32. For example, the mounting portion 322 may be recessed at or near an edge or corner area formed together by the front side and the right side of the upper surface of the inner case 32. In addition, the mounting portion 322 may have a size such that the display module 66 and the touch module 65 may be disposed in the mounting portion 322 parallel to each other and may be plate-shaped.

In addition, the height of the stepped or recessed portion of the mounting portion 322 may correspond to the touch module 65. For example, when the inner case 32 and the outer case 31 are coupled in a state in which the touch module 65 is disposed on the mounting portion 322, the top surface of the touch module 65 may contact an inner surface of the outer case 31.

The mounting portion 322 may define a display opening 322b and a touch opening 322a. The display opening 322b may include an opening at a position corresponding to an arrangement position of the display module 66 and may vertically extend into the inside the mounting portion 322. Accordingly, a portion of the display module 66 may be directed facing toward the outer case 31 through the display opening 322b.

In addition, the touch opening 322a may include an opening at a position corresponding to an arrangement position of the touch module 65. The touch opening 322a may extend into the inside the mounting portion 322 in the vertical direction and may be defined or formed next to and spaced apart from the display opening 322b. A connector 664 may pass through the touch opening 322a to connect the touch module 65 disposed on the top surface of the mounting portion 322 and the display module 66 disposed on the bottom surface of the mounting portion 322.

A support protrusion 322d may be defined or formed outside of the touch opening 322a. The support protrusion 322d may protrude upward from the mounting portion 322 corresponding to the arrangement position of the touch module 65. The support protrusion 322d may support the touch module 65 from below to contact the touch module 65 with the inner surface of the outer case 31. That is, the support protrusion 322d may have a height such that the top surface of the touch module 65 may contact the inner surface of the outer case 31. In addition, a plurality of support protrusions 322d may be provided and may support a plurality of points on the bottom surface of the touch module 65 from under the touch module 65.

The mounting portion 322 may include a fastening hole 322c. A fastening hook 651a of the touch module 65 may be inserted into the fastening hole 322c. A plurality of fastening holes 322c may be provided and may be defined or positioned evenly in the mounting portion 322 to fix or mount and receive the touch module 65 and the display module 66.

In addition, a case coupler 372 may be accommodated or provided in the inner case 32 to couple the display module 66 to the inner surface of the inner case 32. The case coupler 372 may have a shape of a boss to which a screw may be fastened and may protrude downward from the inner upper surface of the inner case 32. In addition, the case coupler 372 may be provided at a position corresponding to that of the case fastener 661b of the display module 66 to couple the screw passing through the case fastener 661b to the case coupler 372. Therefore, the display module 66 may be securely and fixedly coupled or mounted to the bottom surface of the mounting portion 322.

The touch module 65 may include a touch PCB 652 to receive or mount the touch sensor 654 and a touch PCB case 651 to the touch PCB 652.

The touch sensor 654 may be disposed on the touch PCB 652. For example, the touch sensor 654 may be a touch sensor using a piezoelectric element. For example, when the outer case 31 made of metal is pressed, the touch sensor 654 may sense a change in minute or small force or pressure applied to the outer case 31 to detect a touch input. An exemplary configuration of the touch sensing by the piezoelectric type touch sensor 654 is described below with reference to FIG. 16.

A plurality of touch sensors 654 may be provided and may be located at positions corresponding to the pulse mode selector 319a and the on-off selector 319b of the touch input portion 319. For example, when a user manipulates the pulse mode selector 319a and the on-off selector 319b by touch, the touch sensor 654 may detect the touch manipulations respectively.

The touch PCB case 651 may be opened downward and may have a predetermined size to accommodate the touch PCB 652. In addition, the touch PCB case 651 may have a size appropriate for being mounted on the mounting portion 322 without closing or covering the display opening 322b when the touch PCB case 651 is disposed or mounted on the mounting portion 322.

The touch PCB case 541 may include a touch case fastening hook 651a that protrudes downward around the touch PCB case 651. The touch case fastening hook 651a may be fastened to the fastening hole 322c of the mounting portion 322 when the touch module 65 is disposed. The touch PCB case 651 may be supported by the mounting portion 322 without any additional restraining coupling structure.

In addition, the touch PCB case 651 may define a case opening 651b on the top surface thereof and a touch booster 653 may be disposed in the case opening 651b. The case opening 651b may be provided at a position corresponding to the touch sensor 654. Similarly, the touch booster 653 inserted into the case opening 651b may be disposed above the touch sensor 654.

The touch booster 653, which improves the touch recognition by the touch sensor 654, may be made of plastic or rubber, and may be made of elastically deformable material or have an elastically deformable structure. For example, the touch booster 653 may be cut in a spiral shape with respect to a central portion thereof to concentrate a pressure applied on the touch booster 653 to the central portion thereof. That is, when the outer case 31 is slightly deformed, the touch booster 653 in contact with the outer case 31 may be deformed and the touch sensor 654 may be pressed by the touch booster 653.

The touch input portion 319, the touch booster 653, and the touch sensor 654 may be positioned on the same extension line or axis. When a user touches or manipulates the touch input portion 319, the slight deformation of the outer case 31 may be transmitted to the touch sensor 654 through the touch booster 653, thereby ensuring the detection of the touch sensor 654.

An adhesive member 655 may be disposed on the top surface of the touch PCB case 651 and may contact the top surface of the touch PCB case 651 and an inner surface of the outer case 31. For example, the adhesive member 655 may be a double-sided tape or an adhesive, as shown in FIG. 12.

The adhesive member 655 may be entirely disposed on the top surface of the touch PCB case 651 excluding the case opening 651*b* to adhere the top surface of the touch PCB case 651 to the inner surface of the outer case 31. Accordingly, the top surface of the touch module 65 maintains adhesion with the inner surface of the outer case 31, and when the outer case 31 is manipulated or touched, the touch sensor 654 may detect the touch or manipulation by the touch booster 653.

At least a portion of the touch PCB 652 may be exposed through the touch opening 322*a*. A first side of the connector 664 may be connected to the touch PCB 652 through the touch opening 322*a*, and a second side of the connector 664 may be connected to the display PCB 662 of the display module 66. Accordingly, the touch PCB 652 disposed above the mounting portion 322 and the display PCB 662 disposed below the mounting portion 322 may be electrically connected to each other.

In addition, a signal processing operation and a power supply operation of the touch PCB 652 may be performed via the display PCB 662. Therefore, an additional or separate wire or wire supporting structure disposed outside of the inner case may not be needed to connect the touch module 65 for the signal processing operation and the power supply operation. That is, the touch module 65 may be operated by connecting to the display module 66.

Hereinafter, the structure of the knob 40 and the mounting structure thereof are described in detail.

Referring to FIGS. 13 and 14, the knob 40 may be disposed on a front surface of the main body 30 (Shown in FIGS. 1 and 2) to manipulate or facilitate operation of a blender 1. The outer case 31 may include a knob hole 312 on the front surface thereof to receive the knob 40, and the knob 40 may protrude forward from the main body 30 through the knob hole 312.

The inner case 32 may include a knob mounting hole 321 on the front surface thereof. The knob mounting hole 321 may be open to receive the knob 40 placed on the main PCB module 64, and may be disposed behind the knob hole 312. The knob mounting hole 321 may be larger than the knob hole 312 and may receive the knob 40. In addition, a portion of the knob 40 may be exposed to the outside through the knob hole 312.

The knob mounting hole 321 may define or include guide grooves 321*a* at opposite sides of a circumference thereof and the guide groove 321 may be configured to receive ring guides 434 that protrude from both sides of the knob 40. The guide grooves 321*a* may be recessed outward at the circumference of the knob mounting hole 321 and may be defined or formed at opposite sides facing each other. Accordingly, the guide grooves 321*a* may prevent interference between the knob 40 and the inner case 32 when the knob 40 is mounted. In addition, the knob 40 may be guided by a buzzer groove 321*b* and the guide grooves 321*a* when the knob 40 is disposed into the knob mounting hole 321, and the knob 40 may be mounted at an accurate position.

The main PCB 67 may include a knob rotary shaft 671 at the center thereof to which the knob 40 is coupled. The knob rotary shaft 671 may be coupled to the rotation center of the knob 40, and when the knob 40 is manipulated, the knob rotary shaft 671 may be rotated together. The main PCB 67 may include a knob sensing sensor 690 to detect rotation of the knob rotary shaft 671. Accordingly, the blender 1 may select an operation mode, set an operation time period, and set a rotation RPM of the motor 51.

The main PCB 67 may include a buzzer 672 as a sound output portion. The buzzer 672 may notify an operation state or an error message of the blender 1 by voice or sound.

For example, the buzzer 672 may output a sound when power is applied to the blender 1 to inform the user of an operation ready state. The main PCB 67 may include other sound output means such as a speaker instead of the buzzer 672 as the sound output portion.

The knob rotary shaft 671 may be disposed at a central portion of the main PCB 67, and a plurality of LEDs 673*a* and 673*b* may be disposed along the positions corresponding to the circumference of the knob rotary shaft 671, as shown in FIG. 14. The plurality of LEDs 673*a* and 673*b* may be arranged to have a circular shape, and preferably, may include outer LEDs 673*a* disposed at an outside thereof and inner LEDs 673*b* disposed at an inside thereof, as shown in FIG. 14.

Some of the outer LEDs 673*a* may be turned on according to the manipulation or control of the knob 40. That is, when the user manipulates or controls the knob 40 to input a specific manipulation or command, the outer LEDs 673*a* may be turned on based on the manipulation or command.

For example, when a user selects a preset operation mode such as an automatic cooking mode or a manual cooking mode by rotating the knob 40, the outer LEDs 673*a* corresponding to the operation mode may be turned on.

Additionally or alternatively, when a user inputs a time by rotating the knob 40, the outer LEDs 673*a* corresponding to the selected time may be turned on.

Additionally or alternatively, when the a inputs an RPM level by rotating the knob 40, the outer LEDs 673*a* corresponding to the selected RPM level may be turned on.

The plurality of outer LEDs 673*a* may not be arranged at equal distances. That is, when different operations or functionalities are configured to be adjusted based on a rotating degree of the knob 40, arrangement distances of the outer LEDs 673*a* may be set differently by areas.

The inner LEDs 673*b* may be disposed along an inner portion 442 of the knob 40. The inner LEDs 673*b* may be disposed closer to the knob rotary shaft 671 than the outer LEDs 673*a* and may be provided at a position corresponding to the inner portion 442. In addition, the plurality of inner LEDs 673*b* may be arranged in a circular shape and positioned corresponding to or aligning with the inner portion 442, as shown in FIG. 14.

In one embodiment, the inner LEDs 673*b* may all be turned on at once to indicate the state of the blender 1. For example, when the power is supplied to the blender 1, the inner LEDs 673*b* may be turned on to notify the user of the operation ready state of the blender 1. In this example, the inner LEDs 673*b* may transmit different color light from the outer LEDs 673*a*. In addition, the inner LEDs 673*b* may output various colors of light according to circumstances.

A plurality of PCB coupling holes 674 may be defined or formed at or around the circumference of the knob rotary shaft 671. A guide coupling protrusion 446 may be inserted into the PCB coupling hole 674. The number of PCB coupling holes 674 may correspond to the guide coupling protrusions 446 and the PCB coupler 674 may be provided at a position corresponding to the guide coupling protrusion 446. For example, the PCB coupling holes 674 may be radially disposed about the knob rotary shaft 671 and three PCB coupling holes 674 may be disposed apart at an equal distance from each other.

The main PCB 67 may include PCB fastening members 675 at the four edges thereof. The PCB fastening member 675 may couple the main PCB 67 to a main bracket 68 and may be coupled to PCB supporters 687*a*, 687*b*, and 687*c*.

The knob 40 may include a knob decoration 41, a knob body 42, a knob ring 43, and a light guide 44.

The knob decoration 41 may define or form a portion of an outer structure of the knob 40, and in particular, the knob decoration 41 may protrude to the outside of the outer case 31 to facilitate user manipulation or selection. The knob decoration 41 may have a cylindrical shape with an open rear surface, and the diameter of the knob decoration 41 may be slightly smaller than that of the knob hole 312.

The knob body 42 may be coupled to the knob rotary shaft 671 and may be configured to rotate the knob rotary shaft 671 based on user manipulation or input to rotate the knob 40. The knob body 42 may have a cylindrical shape with an opening at or near the rear surface.

The knob body 42 may include a body insertion portion 421 inserted into the body accommodating space 411, a first knob protrusion 423 that protrudes outward from the rear side of the body insertion portion 421, and a second knob protrusion 424 that protrudes from the rear side of the first knob protrusion 423.

The body insertion portion 421 may have a shape corresponding to the body accommodating space 411. In addition, the body insertion portion 421 may define or form an adhesive groove 421A on the front surface thereof, and an adhesive may be disposed in the adhesive groove 421A. For example, when the body insertion portion 421 is inserted into the body accommodating space 411, the knob body 42 may be adhered or coupled to the knob decoration 41.

The first knob protrusion 423 may protrude outward to have a larger diameter than the body insertion portion 421, and a support surface 422 may be disposed between the first knob protrusion 423 and the body insertion portion 421. The support surface 422 may contact the rear side of the knob decoration 41. In addition, an outer diameter of the first knob protrusion 423 may correspond to the knob decoration 41 such that the protrusion of the coupling portion may be minimized when the knob decoration 41 and the knob body 42 are coupled to each other, thereby providing a uniform or integral structure.

The second knob protrusion 424 may protrude outward to have a larger diameter than the first knob protrusion 423. An outer diameter of the second knob protrusion 424 may be larger than a ring opening 435 defined or formed in the knob ring 43. The diameter of the first knob protrusion 423 may be smaller than the knob ring 43 such that the first knob protrusion 423 may be disposed in the ring opening 435. In this example, the second knob protrusion 424 may be disposed behind the ring opening 435 to prevent the knob body 42 from being separated outside of the knob ring 43.

The knob body 42 may include a shaft coupler at the center of the inner surface of the knob body 42. The shaft coupler may have a hollow extending boss shape or a cylindrical shape (not shown in the figure for clarity of illustration and description of FIG. 14.) and may provide a space into which the knob rotary shaft 671 may be inserted. The inner portion of the shaft coupler may have a shape that corresponds to a cross-sectional shape of the knob rotary shaft 671 to transmit a rotational force to the knob rotary shaft 671 when the knob body 42 is rotated.

In addition, a plurality of reinforcing ribs 426 may be disposed on an outer surface of the shaft coupler and may extend radially. The reinforcing ribs 426 may connect the inner surface of the knob body 42 and the shaft coupler. The plurality of reinforcing ribs 426 may be spaced apart from one another by an equal distance to reinforce the knob body 42.

The knob body 42 may be made of a light-transmissive material or a light-reflecting material. A portion of the knob body 42 positioned at the rear side of the knob decoration 41 may be disposed inside the knob hole 312 and the ring opening 435, and may emit light when the inner LEDs 673*b* are turned on. At least the first knob protrusion 423 and the second knob protrusion 424 of the knob body 42 may be made of a light-transmissive material or a light-reflecting material. Accordingly, in one example, when the inner LEDs 673*b* are turned on, a shiny band (or circular) shape may be displayed along the circumference of the knob decoration 41 when viewed from the outside.

The knob ring 43 may be provided at a position corresponding to the knob mounting hole 321. In addition, the knob ring 43 may define a ring opening 435 at the center thereof and the knob body 42 may be disposed in the ring opening 435.

The knob ring 43 may have a disk shape with the ring opening 435 at the center thereof, may have a size smaller than the knob mounting hole 321, and may be disposed in the knob mounting hole 321.

In addition, the knob ring 43 may include an exposed portion 432 defined along the circumference of the ring opening 435 and a case seating portion 431 disposed along the outer circumference of the exposed portion 432.

The exposed portion 432 may form the circumference of the ring opening 435 and may be exposed to outside of the main body 30 through the knob hole 312. The inner diameter of the exposed portion 432 may be substantially the same as or slightly larger than the inner diameter of the ring opening 435 and the diameter of the first knob protrusion 423. In this example, the inner diameter of the exposed portion 432 may be smaller than the outer diameter of the second knob protrusion 424 to prevent or avoid the knob body 42 from being separated.

The exposed portion 432 may include an inclined surface 432*a* on the front surface thereof. The inclined surface 432*a* may be inclined downward toward the knob body 42 and may refract a light transmitted from the outer LEDs 673*a* to direct the light toward the outer surface of the knob body 42.

The case seating portion 431 may extend outward from the outer side of the exposed portion 432. In addition, the case seating portion 431 may be raised or have a step shape from top surface of the exposed portion 432 to provide a surface on which the outer case 31 may be placed. Accordingly, the circumferential surface of the knob hole 312 of the outer case 31 may be supported by the knob ring 43. In this example, the outer circumference of the exposed portion 432 and the top surface of the case seating portion 431 may define a step having a height corresponding to a thickness of the outer case 31.

The knob ring 43 may include one or more ring guide 434 provided on an outer side thereof and the ring guide 434 may extend rearward, toward the light guide 44. In one example, the knob ring 43 may include the ring guides 434 at opposite sides thereof facing each other, and the ring guides 434 may be accommodated in the guide grooves 321*a* defined or formed in the inner case 32. Accordingly, the assembled knob 40 may be disposed at a corresponding position of the inner case 32.

The case seating portion 431 may define or form one or more ring fastening grooves 433. In one example, a plurality of ring fastening grooves 433 may be defined or formed at positions facing each other and may be arranged at equal distances along or adjacent the circumference of knob ring 43. The ring fastening grooves 433 may receive one or more guide hooks 444 of the light guide 44, and the knob ring 43 and the light guide 44 may be firmly or tightly coupled to each other by the guide hook 444 and the ring fastening groove 433.

The knob ring 43 may be made of light-transmissive material and at least the exposed portion 432 exposed through the knob hole 312 may be made of light-transmissive material. Accordingly, the light from the outer LEDs 673a may be transmitted through the light guide 44. In one example, when a specific outer LED 673a among the plurality of outer LEDs 673a is turned on, the light may be transmitted through the exposed portion 432 and may be displayed.

The light guide 44 may form a rearmost portion of the knob 40 and may couple the knob 40 and the main PCB 67. In addition, the light guide 44 may guide the light transmitted from the outer LEDs 673a and the inner LEDs 673b when the light guide 44 contacts the main PCB 67.

Hereinafter, the configuration of a controller 640 of the blender 1 according to and embodiment of the present disclosure is described.

As shown in FIG. 15, the blender 1 may include a controller 640 to control the functionality of each component. The PCB module 64 may include the controller 640, and the controller 640 may be, for example, such as a microcontroller, a microcomputer, or a microprocessor, but not limited thereto.

The controller 640 may be electrically connected to a motor controller 610 to control the motor 51 of the motor assembly 50. The PCB module 61 may include the motor controller 610. The controller 640 may transmit a control signal to the motor controller 610 to control the output of the motor 51, and the motor controller 610 may adjust the output of the motor 51 by controlling the power level supplied to the motor 51.

In addition, the controller 640 may be electrically connected to the power converter 60 such as the power PCB module 62. Power input from the external power source 70 may be converted by the power converter 60 and may be supplied to the controller 640 and the motor controller 610.

In addition, the controller 640 may be electrically connected to a touch sensor 654 and a knob sensing sensor 690. The controller 640 may receive, from the touch sensor 654, a touch manipulation or input signal for a power on-off manipulated or adjusted by the user and a touch manipulation signal for a pulse mode operation and receives, from the knob sensing sensor 690, a signal to select a cooking mode and a signal to select an RPM level by the user.

In addition, the controller 640 may be electrically connected to the memory 641. The controller 640 may call or control the operation conditions for each cooking mode. For example, the controller 640 may generate a control signal to control the motor 51 based on an RPM level and/or an operating time period of a motor received or called from the memory 641. The memory 641 may store the RPM level and the operating time period in advance. In addition, as described below, when a target RPM level is changed according to a user selection during a pulse mode operation, the memory 641 may temporarily store the changed target RPM level.

In addition, the controller 640 may be electrically connected to the display 318 and the sound output portion 672. The controller 640 may control the display 318 to indicate or display the operation state information and operation time information of the blender 1 and may control the sound output portion 672 to output, for example, such as a buzzer to indicate an operation state or an error message of the blender 1 by voice or sound.

In addition, the controller 640 may be electrically connected to a timer 642. The controller 640 may control the timer 652 to measure an elapse or duration of an operation time period for each operation mode of the blender 1 and may control the display 318 to display the remaining time period.

Hereinafter, a configuration or a process of operation control of the blender 1 according to one embodiment of the present disclosure, for example, a configuration or a process of pulse mode operation control, is described with reference to FIGS. 16 to 18.

In one embodiment of the present disclosure, the motor 51 may be operated or driven for a predetermined time period desired or selected by a user by a touch input to drive the motor 51 in a pulse mode, thereby significantly improving user convenience.

That is, the user may operate the blender 1 in a pulse mode by touching a pulse mode selector 319a disposed on an upper surface of a main body 30 of the blender 1 without additional setting.

The pulse mode selector 319a of the blender 1 according to an embodiment of the present disclosure may be integrated with the outer case 31 made of metal and a touch sensor 654 configured to sense a touch manipulation input to the pulse mode selector 319a that may be made of a piezoelectric element.

As shown in FIG. 16, the touch sensor 654 using the piezoelectric element may detect a change in touch force or touch pressure on the touch sensor 654. In one example, the touch sensor 654 may detect an input based on the amount of change in the touch force or pressure reaching or satisfying a predetermined set value.

In one example, when a user continuously presses (or holds down) the pulse mode selector 319a, the touch sensor 654 may not sense or detect further input when the user manipulation or input does not change the pressing force or pressure. Accordingly, the touch sensor 654 made of the piezoelectric element may operate differently from a long-key input method where the motor 51 may be continuously operated while the user continuously presses (or holds down) a physical push button and terminates the motor operation thereof when the force of pressing the push button is released.

In one embodiment of the present disclosure, the piezoelectric element-type touch sensor 654 may be provided a means for adjusting the pulse mode operation time period based on a number of user touch inputs (e.g., consecutive number of touch inputs) to the pulse mode selector 319a.

Referring to FIG. 17, for example, when the touch sensor 654 detects a user touch input on the pulse mode selector 319a of the touch input portion 319, the controller 640 may transmit, to the motor controller 610, a control signal to operate the motor 51 for an operation time period (e.g., a predetermined time period) based on a target RPM that may be set in advance and stored in a memory 641.

In this example, the operating time period may include a first time period (t1) for which a current rotation speed of the motor is increased to a target RPM level and a second time period (t2) for which the current rotation speed of the motor is maintained at the target RPM level after reaching the target RPM level.

In one example, the first time period (t1) may be 1 second and the second time period (t2) may be 2 seconds.

In one example, the current rotation speed may instantaneously increase to reach the target RPM level in about 1 second in consideration of the pulse mode driven for a very short time period.

In this example, the target RPM level may be preset to be a maximum RPM level that may be output by the motor 51.

The controller 640 may control the timer 652 to measure a time period from a time point at which the motor is operated, and after approximately 3 seconds from the operation start time point thereof, may transmit, to the motor controller 610, a control signal to cut off the power supplied to the motor 51, and the motor controller 610 may stop the motor by cutting off the power supplied to the motor.

Accordingly, the blender 1 may be operated in the pulse mode with one touch manipulation input based on the foregoing processes described above.

In one example, when the user touch manipulation is input to the pulse mode selector 319a again while the motor 51 is stopped, the blender 1 may be operated in the pulse mode similarly to the foregoing processes described above.

In one example, the user may determine that the pulse mode operation time period may need to be extended based on the state or condition of the food or object inside the jar 10 during the pulse mode operation. If the user touch manipulation is input again before the operation time period of the pulse mode is elapsed, the controller 640 may extend the operation time period in the pulse mode by a third time period (t3). If the user touch manipulation is input again once, the controller 640 may extend the operating time period by adding a time period corresponding to the third time period (t3)*1 time, and if the user touch manipulation is input again twice, the controller 640 may further extend the operating time period by adding a time period corresponding to the third time period (t3)*2 times.

In this example, the third time period (t3) may be shorter than the sum of the first time period (t1) and the second time period (t2), preferably the second time period (t2) may be, for example, 2 seconds.

Accordingly, the operation time period may be added by 2 seconds by an additional touch input to the pulse mode selector 319a during a pulse mode operation based on one (or a single) touch input, thereby operating the blender 1 continuously and additionally in the pulse mode and further improving user convenience.

In one example, the motor 51 may be operated at the maximum RPM level during a pulse mode operation, and if the pulse mode operation time period is limitlessly increased, the motor assembly 50 including the motor may be damaged. In addition, it may be necessary to prepare for an accidental additional touch input to the pulse mode selector 319a caused against the user intention or by user carelessness during the pulse mode operation.

Therefore, the number of additional extension of the operation time period in the pulse mode may be limited to a predetermined level after the first one-time (or single) touch manipulation is input to the pulse mode selector 319a.

For example, as shown in FIG. 18, the number of additional extension of the operation time period in the pulse mode may be limited to a total of 4 times, and accordingly, the maximum time period for operating the blender 1 in the pulse mode may be limited to 11 seconds. That is, even if a touch manipulation is input to the pulse mode selector 319a, after the operation time period is additionally extended up to 4 times, the operation time period may not be further extended, and the motor may be stopped after 11 seconds has elapsed.

When the motor 51 stops, the number of extension of the operation time period in the pulse mode may be initialized. The touch manipulation input after the motor 51 has stopped may be set to be recognized or determined as a first one-time (or single) input. According to the similar process described above in accordance with FIG. 18, the operation time period may be further extended by 4 times.

An embodiment in which the target RPM level of the motor 51 is fixed to the maximum RPM level during a pulse mode has been described. However, an embodiment in which the user selects and sets the target RPM level is also possible.

That is, the number of rotations of the blade module 14 and the motor 51 may be adjusted according to the user intention or preference based on the type of food (or object) cooked (or cut, blended, or ground) inside the jar 10, thereby improving the user convenience.

The target RPM may be adjusted by selecting a target RPM level based on the user manipulation input to the knob 40.

For example, when the touch sensor 654 detects the user touch on the pulse mode selector 319a of the touch input portion 319, the controller 640 may not immediately operate the motor 51 and may wait until the user manipulation is input to the knob 40.

Further, when the touch sensor 654 detects a user selection of a manual cooking mode from among a plurality of available cooking modes by the first knob manipulation and selects an RPM level in the manual cooking mode as shown in Table 1 below by additional knob manipulation, the controller 640 may set the selected RPM level to a target RPM level of the motor 51 for pulse mode operation.

TABLE 1

| <RPM level and the number of rotations of motor (RPM) in manual cooking mode> | | | | | | | |
| --- | --- | --- | --- | --- | --- | --- | --- |
| RPM level | 0 | 1 | 2 | 3 | 4 | 5 | 6 |
| The number of rotations of motor | 0 | 1500 | 2500 | 3500 | 5000 | 6500 | 8000 |
| RPM level | 7 | 8 | 9 | 10 | 11 | 12 | — |
| The number of rotations of motor | 9500 | 11000 | 12500 | 14000 | 15500 | 17000 | — |

Subsequently, the controller 640 may transmit, to the motor controller 610, a control signal to operate the motor 51 for a preset (or predetermined) operating time period and at a set RPM level to operate in the pulse mode.

In this example, the configuration of the operation time period and the further extension of the operation time period may be maintained or set as described in the above-described embodiment.

Hereinafter, exemplary methods for controlling the blender 1 according to embodiments of the present disclosure is described with reference to FIGS. 19 to 23.

An exemplary method for controlling the blender 1 according to a first embodiment of the present disclosure (S100) is described with reference to FIGS. 19 and 20.

In one example, when a controller 640 detects that a user touch manipulation is input to the on-off selector 319b of the touch input portion 319 using the touch sensor 654, the controller 640 may wait or stay idle while the blender 1 is in a power-on state. (S101).

Subsequently, after the controller 640 detects that the user touch manipulation is input on the pulse mode selector 319a using the touch sensor 654 while the blender 1 is in the power-on state, the controller 640 may determine the state of the motor 51 as a stopped state or a non-stopped state to operate the blender 1 in a pulse mode (S102 and S103).

Based on the determination that the motor 51 is not in the stopped state (i.e., the motor 51 is driven) at S103, the controller 640 may generate an error alarm indicating that the pulse operation may not be executed using a sound output portion 672 or may generate an error message using a display 318 and may wait until the motor 51 is stopped (S104).

Based on the determination that the motor is in the stopped state at S103, the controller 640 may set an initial operation time period (t1+t2) and a target RPM level to operate the motor 51 in the pulse mode (S105).

In this example, the initial operation time period is the sum of a first time period (t1) and a second time period (t2), for example, the first time period (t1) may be 1 second, and the second time period (t2) may be 2 seconds.

In addition, the target RPM may be the maximum RPM level that the motor 51 may output, and may be, for example, 12 levels (17000 rpm), which may be the highest level.

After the initial operating time period and the target RPM are set at S105, the controller 640 may transmit, to the motor controller 610, a control signal to operate the motor 51 at the target RPM level (S106).

As shown in FIG. 20, S106 may include a step (S1061) of accelerating the current rotation number of the motor 51 to a target RPM level for a first time period (II) and step (S1062) of maintaining the target RPM level for a second time period (t2) after the current rotation number of the motor 51 reaches the target RPM level.

Subsequently, after the motor 51 is operated (or begins operating) at S106, the controller 640 may control the timer 642 to calculate an elapsed time period from the time point at which the motor 51 is operated (or begins to operate) and may control the display 318 to display the remaining time period (S107).

Subsequently, the controller 640 may determine whether the elapsed time period after the time point at which the motor 51 is operated (or begins operating) elapses the operation time period set at S105 (S108).

Based on the determination that the set operation time period (t1+t2) has elapsed at S108, the controller 640 may transmit, to the motor controller 610, a control signal to stop the motor and the motor controller 610 may stop the motor 51 by cutting off the power supplied to the motor 51 (S113).

Based on the determination that the elapsed time period has not elapsed the set operation time period (t1+t2) at S108, the controller 640 may determine an additional re-input or a non-additional re-input of the user touch manipulation to the pulse mode selector 319a using the touch sensor 654 (S109). That is, the controller 640 may determine whether user intention to extend the operation time period of the pulse mode is input before the end of the pulse mode operation.

Based on the determination that n-number of times of the touch manipulations has been input again on the pulse mode selector 319a at S109, the controller 640 may update the number of accumulated or total re-input by adding the number of re-inputs of touch manipulation as n-number of times and may store the number in a memory 641 (S110).

Subsequently, the controller 640 may determine whether the updated accumulated or total re-input number exceeds a predetermined set number (S111). In this example, the predetermined set number may be, for example, four times, and the controller 640 may determine whether the accumulated or total number of re-inputs exceeds four times.

Based on the determination that the accumulated or total number of re-inputs is less than the set number at S111, the controller 640 may add a time obtained by multiplying a third time period (t3) by the re-input number (n) to the remaining time period and may reset the operation time period in the pulse mode (S112).

In this example, the third time period (t3) may be shorter than the sum of the first time period (t1) and the second time period (t2), preferably the same time as the second time (t2), for example, may be 2 seconds.

When the operation time period of the pulse mode is reset at S112, the process may go back to S107 and the controller 640 may display the time period acquired on the display 318, by adding, to the remaining time period, the time period (t3*n) obtained by multiplying the third time period (t3) by the re-input number (n).

Based on the determination that the accumulated or total re-input number is greater than or equal to the set number at S111, the process may go back to S108 and the controller 640 may determine whether the operation time period has elapsed again without resetting the operation time period of the pulse mode or changing the remaining time period.

A method for controlling a blender 1 according to a second embodiment of the present disclosure (S200) is described with reference to FIGS. 21 and 23.

Similar to the method for controlling the blender 1 according to the first embodiment (S100), the controller 640 may wait or stay idle while the blender 1 is in a power-on state based on the determination that the touch sensor 654 has detected a user touch manipulation input on the on-off selector 319 of the touch input portion 319 (S201).

Subsequently, when the controller 640 determines that user touch manipulation is input on the pulse mode selector 319a while the blender 1 is in the power-on state using the touch sensor 654, the controller 640 may determine the state of the motor 51 as a stopped state or a non-stopped state to operate the blender 1 in a pulse mode (S202 and S203).

Based on the determination that the motor is not in the stopped state at S203, the controller 640 may control the sound output portion 672 to generate an error alarm indicating that the pulse operation may not be executed, or may control the display 318 to generate an error message and wait until the motor 51 is stopped (S204).

Based on the determination that the motor 51 is in the stopped state at S203, the controller 640 determine input or non-input of user manipulation of rotating the knob 40 using a knob sensing sensor 690 (S205). That is, alternative to the first embodiment, the controller 640 may determine whether the user intended to input or select a target RPM level before performing the pulse mode operation.

Based on the determination that the manipulation of rotating the knob 40 is not input at S205, the next step is performed in the same manner as that described in the first embodiment.

That is, the controller 640 may set an initial operation time period (t1+t2) and a target RPM level to operate the motor 51 in a pulse mode and ay transmit, to a motor controller 610, a control signal to operate the motor 51 with the target RPM level to operate the motor 51 (S206 and S207). As shown in FIG. 23, S207 may include a step (S2071) of accelerating a current rotation number of the motor 51 to a target RPM level for a first time period (II) and a step (S2072) of maintaining the target RPM level for a second time period (t2) after the current rotation number of the motor 51 reaches the target RPM level.

When the motor 51 is operated at S207, the controller 640 may control the timer 642 to calculate an elapsed time period from the time point at which the motor 51 is operated (or begins to operate), may control the display 318 to indicate or display the remaining time period, and may determine whether the elapsed time period after the time point at which the motor 51 is operated (or begins to operate) elapses the operation time period set at S206 (S208 and S209).

In addition, based on the determination that the set operation time period has elapsed at S209, the controller 640 may control the motor 51 to be stopped (S214), and based on the determination that the set operation time period has not elapsed, the controller 640 may control the touch sensor 654 to determine additional re-input or non-additional re-input of touch manipulation on the pulse mode selector 319*a* (S210).

Based on the determination that n-number of times of touch manipulation is input again to the pulse mode selector 319*a* at S210, the controller 640 may update an accumulated (or total) re-input number by adding the touch manipulation re-input number to n times, may store the number in the memory 641, and may determine whether the updated accumulated re-input number is equal to or greater than the set number (S111 and S212).

Based on the determination that the accumulated number of re-inputs is less than the set number at S212, the controller 640 may reset the operation time period of the pulse mode by adding, to the remaining time period, a time period (t3*n) acquired by multiplying the third time period (t3) by the re-input number (n) (S213). Subsequently, the process may go back to S208 and the controller 640 may control the display 318 to display the time period obtained by adding, to the remaining time period, the time period (t3*n) obtained by multiplying the third time period (t3) by the re-input number (n). Based on the determination that the accumulated re-input number is greater than or equal to the set number at S212, the processes may go back to S209, and at S209, the controller 640 may determine whether the operation time period has elapsed again without resetting the operation time period of the pulse mode or changing the remaining time period.

Based on the determination that the manipulation of rotating the knob 40 is input at S205, the controller 640 may control the knob sensing sensor 690 to identify a selected cooking (or operation) mode as shown in FIG. 22 (S215).

Based on the determination that a cooking (or operation) end mode or an automatic cooking (or operation) mode is selected at S215, the controller 640 may determine that the user does not wish or intend to change the target RPM level. In this example, the process may go back to S206 to set the initial operation time period (t1+t2) and the target RPM level without changing the target RPM level.

Based on the determination that a manual cooking (operation) mode is selected at S215, the controller 640 may determine an RPM level selected based on the additional manipulation of rotating the knob 40 (S216).

After the selection of the RPM level is identified at S216, the controller 640 may reset the selected RPM level to be the target RPM level (S217). In this example, the selected RPM level may be any one of levels 1 to 12 described in Table 1 above.

After the target RPM level is reset at S217, the controller 640 may transmit, to the motor controller 610, a control signal to operate the motor 51 with the selected RPM level to operate the motor 51 (S218).

When the motor 51 is operated at S218, the controller 640 *m* the S208 above.

The present disclosure has been described with reference to exemplary drawings as described above; however, the present disclosure is not limited to the embodiments and the drawings set forth herein, and various modifications can be made by those skilled in the art within the scope of the technical idea of the present disclosure. Further, even if working effects obtained from configurations of the present disclosure are not explicitly described in the description of the embodiments of the present disclosure, effects predictable from the corresponding configuration have to be recognized.

What is claimed is:

1. A blender, comprising:
a jar comprising a blade module to cut an object;
a main body to receive the jar and comprising a motor to rotate the blade module; and
a controller disposed inside the main body and configured to operate the motor;
wherein the main body further comprises an outer case forming an outer structure of the main body,
wherein the outer case comprises a touch input portion on an outer surface of the outer case,
wherein a touch sensor is disposed on an inner surface of the outer case at a position corresponding to the touch input portion to detect a touch input on the touch input portion, and
wherein the controller is configured to determine an operation time period of the motor based on the touch input detected by the touch sensor, and
wherein the controller is configured to set the operation time period and a target revolutions per minute (RPM) level of the motor before the beginning of the operation of the motor, and
wherein the operation time period comprises a first time period indicating a length of time period for increasing a current rotation number to a predetermined target RPM level and a second time period indicating a length of time period for maintaining a current rotation speed of the motor at the target RPM level after reaching the target RPM level, and
wherein the first time period is shorter than the second time period, and
wherein the target RPM level is a maximum RPM level of the motor.

2. The blender of claim 1, wherein the controller is configured to determine whether the operation time period has elapsed after a beginning of an operation of the motor, and based on a determination that the operation time period has elapsed, the controller is configured to cut off a power supplied to the motor to stop the motor.

3. The blender of claim 2, wherein the first time period is 1 second and the second time period is 2 seconds.

4. The blender of claim 2, wherein the controller is configured to determine whether an additional touch input is detected on the touch input portion during the operation time period.

5. The blender of claim 4, wherein the controller is configured to, based on determining the additional touch input is detected on the touch input portion, determine a number of accumulated additional touch inputs by adding the number of accumulated additional touch inputs on the touch input portion to a re-input number after the beginning of the operation of the motor, and determine whether the number of accumulated additional touch inputs exceeds a predetermined set number.

6. The blender of claim 5, wherein the controller is configured to, based on determining the number of accumulated additional touch inputs is less than the predetermined set number, reset the operation time period by extending the operation time period by a predetermined time period based on a third time period.

7. The blender of claim 6, wherein the third time period is shorter than a sum of the first time period and the second time period.

8. The blender of claim 6, wherein the third time period is the same as the second time period.

9. The blender of claim 5, wherein the controller is configured to, based on determining the number of accumulated additional touch inputs is larger than or equal to the predetermined set number, not reset the operation time period.

10. The blender of claim 1, further comprising:
a knob disposed to pass through an outer surface of the outer case and configured to receive rotation manipulation to switch an operation mode of the motor; and
a knob sensing sensor to detect an amount of rotation of the knob based on the rotation manipulation,
wherein the controller is configured to determine whether a signal for the rotation manipulation is input from the knob sensing sensor before operating the motor based on the determination that the touch input is detected by the touch input portion.

11. The blender of claim 10, wherein the controller is configured to, based on determining the signal for the rotation manipulation is input, determine an operation mode selected based on information on the amount of rotation of knob received from the knob sensing sensor.

12. The blender of claim 11, wherein the controller is configured to, based on determining the operation mode selected based on the amount of rotation of the knob is an operation end mode or an automatic operation mode, set a maximum RPM level of the motor to be the target RPM level.

13. The blender of claim 12, wherein the controller is configured to, based on determining the operation mode selected based on the amount of rotation of the knob is a manual operation mode, determine an RPM level selected based on the amount of rotation of the knob received from the knob sensing sensor after the manual operation mode is selected.

14. The blender claim 13, wherein the controller is configured to set the selected RPM level to be the target RPM level.

15. The blender of claim 1, wherein the touch input portion is integrated with the outer case.

16. The blender of claim 11, wherein the operation mode is at least one of a cooking mode, a manual cooking mode, or an automatic cooking mode.

17. The blender of claim 6, wherein the predetermined time period is determined by multiplying the third time period by the re-input number.

18. The blender of claim 1, wherein the touch sensor comprises a piezoelectric element.

* * * * *